United States Patent
Hassan

(10) Patent No.: US 9,962,878 B2
(45) Date of Patent: May 8, 2018

(54) MULTI-LEVEL UNITARY SAFETY SURFACE TILES

(71) Applicant: PLAYSAFER SURFACING, LLC, Lakewood, NJ (US)

(72) Inventor: Morris Hassan, Lakewood, NJ (US)

(73) Assignee: Playsafer Surfacing LLC, Lakewood, NJ (US)

( * ) Notice: Subject to any disclaimer, the term of this patent is extended or adjusted under 35 U.S.C. 154(b) by 0 days. days.

(21) Appl. No.: 15/289,339

(22) Filed: Oct. 10, 2016

(65) Prior Publication Data
US 2017/0101788 A1    Apr. 13, 2017

Related U.S. Application Data

(60) Provisional application No. 62/240,415, filed on Oct. 12, 2015.

(51) Int. Cl.
| | |
|---|---|
| *B29C 45/44* | (2006.01) |
| *E04F 15/02* | (2006.01) |
| *E04F 15/10* | (2006.01) |
| *E04F 15/22* | (2006.01) |
| *B29L 31/00* | (2006.01) |

(52) U.S. Cl.
CPC ........ *B29C 45/44* (2013.01); *E04F 15/02038* (2013.01); *E04F 15/02183* (2013.01); *E04F 15/105* (2013.01); *E04F 15/22* (2013.01); *B29L 2031/732* (2013.01); *E04F 2201/0153* (2013.01);
(Continued)

(58) Field of Classification Search
CPC .......... E04F 15/02183; E04F 15/02172; E04F 15/02177; E04F 15/02188; E04F 15/02405; E04F 15/02411; E04F 15/02447; E04F 15/02452; E04F 15/02; E04F 15/02011; E04F 15/02022; E04F 15/02038; E04F 15/0205; E04F 15/042; E04F 15/043; E04F 15/10; E04F 15/102; E04F 15/105; E04F 15/107; E04F 15/225; E04F 2201/025;
(Continued)

(56) References Cited

U.S. PATENT DOCUMENTS 3,011,602 A * 12/1961 Ensrud ...................... E04C 2/32
  244/123.12
5,399,406 A * 3/1995 Matsuo ..................... B32B 3/12
  428/166
(Continued)

*Primary Examiner* — Jessica L Laux
(74) *Attorney, Agent, or Firm* — Weiss & Arons LLP

(57) ABSTRACT

A multi-level unitary safety surface tile. The tile may be of monolithic construction. The tile may include rubber. The tile may include an upper level and a lower level. Hollow protrusions may extend between the levels. At least one protrusion may include resilient walls extending from the upper layer and converging to a protrusion bottom-cap in the lower level. Inter-protrusion ribs may span between and support adjacent protrusions. With the lower layer disposed upon an underlayer, the protrusions may support the upper level. The tile may attenuate impact forces incident upon the upper layer. The tile may constitute a unitary safety surface. The tile may include structures facilitating interlocking of adjoining tiles into a multi-tile unitary safety surface. Protrusion extensions and/or support ribs may support the structures. The tile may be manufactured in a one-piece molding process utilizing mold forms maintained parallel to opposable faces of a mold press.

7 Claims, 18 Drawing Sheets

(52) U.S. Cl.
CPC ... *E04F 2201/021* (2013.01); *E04F 2201/043* (2013.01); *E04F 2203/08* (2013.01)

(58) Field of Classification Search
CPC ........ E04F 2201/043; E04F 2201/0153; E04F 2203/08
See application file for complete search history.

(56) References Cited

U.S. PATENT DOCUMENTS

| | | | |
|---|---|---|---|
| 6,938,290 B2* | 9/2005 | McKinney | A47C 7/021 297/452.27 |
| 8,528,278 B2* | 9/2013 | Sippola | A61H 3/066 52/177 |
| 8,955,278 B1* | 2/2015 | Mills | E04B 5/48 52/302.3 |
| 2002/0017805 A1* | 2/2002 | Carroll, III | A62B 1/22 296/187.03 |
| 2016/0053498 A1* | 2/2016 | Brown | E04F 15/225 52/403.1 |

* cited by examiner

MULTI-LEVEL UNITARY SAFETY SURFACE TILES

CROSS-REFERENCE TO OTHER APPLICATIONS

This application is a nonprovisional of U.S. Provisional Application No. 62/240,415, which was filed on Oct. 12, 2015, and is hereby incorporated by reference herein in its entirety.

FIELD OF TECHNOLOGY

Aspects of the disclosure relate to surface tiles. More particularly, the disclosure relates to safety surface tiles for use in playgrounds, or in other suitable areas such as indoor or outdoor recreational spaces. Such recreational spaces may include rock climbing training centers, areas surrounding trampolines, gymnasium floors or other areas that may require impact attenuation.

BACKGROUND OF THE DISCLOSURE

To protect children from fall injuries, play areas have been required to be provided with safety surfaces. A safety surface may be required to underlie and/or cover a play area on which children may fall. The area may typically be associated with playground equipment, such as "jungle gyms," swings and horizontal ladders, or with gymnasium equipment, such as parallel bars, gymnastic rings and climbing ropes. A fall from such playground equipment or gymnasium equipment can be from an elevation several times a child's height. The safety surface is intended to cushion the fall by attenuating impact forces associated with the fall.

Safety surfaces may be also be mandated by requirement, or recommended as "best practice," for other play areas and recreational areas as well, such as in zones along paths and adjacent to "whirls"/"roundabouts" and rock climbing walls.

The Americans with Disabilities Act (ADA) requires that all public playgrounds be accessible to disabled people. ADA standards require a unitary (continuous or with minimal gaps) safety surface such as poured-in-place rubber or edge-joined rubber tiles, so as to provide wheelchair accessibility. These surfaces can be relatively hard and do not provide much cushion to protect children from falls. An additional drawback to unitary surfaces is lack of durability.

Formation of unitary surfaces from interlockable tiles may contribute to overall durability of such surfaces. Formation of unitary surfaces from interlockable tiles may contribute to overall durability of such surfaces by allowing for modular replacement of worn areas of the surfaces without the need to replace the entirety of the surfaces. Formation of unitary surfaces from interlockable tiles may facilitate maintenance of such surfaces.

More durable cushioning unitary surfaces may include interlocked interlockable tiles of natural or synthetic rubber with sub-surface protrusions supporting an upper surface of each tile. The protrusions may be supported from below by a firm substrate underlayer. Resilience and resistance to compression of the protrusions may attenuate impact of a fall upon the upper surface. The resilience and resistance to compression of the protrusions may lend durability to the upper surface.

A drawback to tiles featuring sub-surface protrusions is difficulty of manufacture. Individual tiles may require assembly of multiple components or layers to join an upper layer bearing the upper surface with a protrusion-bearing layer.

It would be desirable, therefore, to provide apparatus directed to, and methods for producing, safety tiles with a unitary (single-piece; one-piece; monolithic) structure, such tiles not requiring assembly of multiple components or layers, and that feature sub-surface protrusions so as to provide good attenuation of impact force to protect children from falls.

It would be desirable, also, to provide apparatus directed to, and methods for producing, interlockable unitary safety tiles featuring protrusions, such tiles facilitating on-site assembly and ease of maintenance of high-quality, safe, durable and accessible unitary surfaces.

SUMMARY OF THE DISCLOSURE

It is an object of the embodiments disclosed herein to provide apparatus directed to, and methods for producing, safety tiles for formation of high-quality, safe, durable and accessible unitary (continuous or with minimal gaps) surfaces that may be readily maintained. Such surfaces may be used in association with playground equipment and/or gymnasium equipment, in association with recreational areas including water/spray parks, and in work areas as anti-fatigue mats.

It is also an object of these embodiments to provide apparatus directed to, and methods for producing, safety tiles of unitary (single-piece; one-piece; monolithic) structure that feature multiple levels. A safety tile of unitary structure featuring multiple levels may be termed a multi-level unitary safety surface tile. The tile may include an upper level. The tile may include a lower level.

It is also an object of these embodiments to provide apparatus directed to, and methods for producing, interlockable playground safety tiles that may be interlocked on-site for ease of assembling a unitary play surface from the tiles. The interlocking of the tiles may be provided by integral complementary interlock features on adjacent tiles of the play surface. The interlocking of the tiles may require no extraneous hardware to be combined with the tiles.

The upper level of a tile may bear an integral top surface. The top surface may be smooth. The top surface may be textured. A textured top surface may minimize slippage on the top surface. The textured top surface may be substantially coterminous with an upper surface of the upper level. The textured top surface may be less extensive in area than the upper surface. The upper surface may, inward from the edges of the upper level, bear texture-less areas. The texture-less areas may border the top surface. The tile may bear beveled areas between its upper surface and its edges. The beveled areas may border the top surface.

The upper layer may have a thickness extending substantially perpendicularly from the upper surface. The thickness may be substantially uniform throughout an area of the upper level.

Along outer edges of the upper level, the upper level may bear the interlock features. Along a perimeter defined by the outer edges, the upper level may bear the interlock features. The interlock features may extend beyond the outer edges. The interlock features may extend beyond the perimeter.

The perimeter may have a rectilinear shape. The perimeter may have a rectangular shape. The perimeter may have a square shape. The perimeter may have any suitable shape. Any suitable shape may include a triangular shape. Any suitable shape may include a rounded shape.

The upper level may bear, opposite the top surface, an integral bottom surface. The thickness of the upper level may lie between the top surface and the bottom surface.

The upper level may feature, opposite the upper surface, integral sub-surface protrusions. The protrusions may support the upper level. The protrusions may be supported from below.

The protrusions may extend away from the upper level. A protrusion may include one or more walls. A first end of a wall of the protrusion may be integral to the upper level. A second end of the wall may be continuous with the bottom surface. The protrusion may extend away from the upper level toward the lower level. Walls of the protrusion may converge toward the lower level. The second end of the wall of the protrusion may be integral to the lower level.

Between the upper level and the lower level, the protrusion may feature a hollow region. The hollow region may be bounded by the walls of the protrusion. The hollow region may be bounded by the upper level and the lower level. The hollow region may have a cross-section in a plane perpendicular to the bottom surface.

The walls of the protrusion may define a first opening to the hollow region. The walls of the protrusion may define a second opening to the hollow region. The first opening and the second opening may be congruent. The first opening and the second opening may be substantially identical in shape. The first opening and the second opening may be substantially identical in size. The first opening and the second opening may face each other. The cross-section of the hollow region may lie in a plane facing the first and second openings.

Integral inter-protrusion ribs may support the upper level. One or more than one integral inter-protrusion rib may support adjacent protrusions. The inter-protrusion rib may span a gap between the two adjacent protrusions. Between the two adjacent protrusions, the upper level may bear a side of the inter-protrusion rib. Between the two adjacent protrusions, the bottom surface of the upper level may be continuous with the side of the inter-protrusion rib. The inter-protrusion rib may extend away from the upper level. The inter-protrusion rib may span a gap between facing walls of the two adjacent protrusions. The inter-protrusion rib may extend toward the lower level.

The lower level may rest upon a firm substrate underlayer underlying the unitary safety surface. Points of contact of the sub-surface protrusions with the underlayer may be part of the lower level of the tile.

An interlock feature may be within the perimeter of the upper level. The interlock feature may extend beyond the perimeter. The interlock feature may extend substantially perpendicularly to an outer edge of the upper level.

The complementary interlock features may include a trough on one tile to receive and/or to hold a projecting tongue on an adjacent tile. The trough may parallel the tile edge. The trough may be open facing in a direction away from the upper surface. The tongue may slip into the trough from below the trough. The trough may be open facing in a direction toward the upper surface. The tongue may slip into the trough from above the trough.

The complementary interlock features may include a slot on one tile to receive and/or hold a projecting peg on an adjacent tile. The complementary interlock features may include any suitable set of complementary features. Any suitable set of complementary features may include a tenon-like projection on one tile and a mortice-like receiver of the tenon on the adjacent tile. Any suitable set of complementary features may include complementary engageable teeth or ridges on adjacent tiles.

The interlock feature may be part of an integral ledge extending beyond the outer edge. The ledge may be supported by one or more protrusions. The ledge may be supported by one or more support ribs. The support ribs may extend from protrusions. The support ribs may be supported from below. The support ribs may rest upon the underlayer.

The underlayer may be flat. The underlayer may be flat throughout the area of the unitary safety surface. The underlayer may be straight. The underlayer may be straight throughout the area of the unitary safety surface. The underlayer may be horizontal. The underlayer may be horizontal throughout the area of the unitary safety surface. The underlayer may be firm. The underlayer may be firm throughout the area of the unitary safety surface. The underlayer may be hard. The underlayer may be hard throughout the area of the unitary safety surface.

The underlayer may include an underlayer material. The underlayer material may include concrete. The underlayer material may include asphalt. The underlayer material may include any other suitable material. Other suitable material may include compressed stone. Other suitable material may include flooring surfacing material.

The underlayer may be prepared for supporting the protrusions. The underlayer may be prepared for assembly and use of the unitary safety surface. Preparing the underlayer may involve flattening the underlayer. Preparing the underlayer may involve straightening the underlayer. Preparing the underlayer may involve making the underlayer horizontal. Preparing the underlayer may involve leveling the underlayer.

Manufacturing the tile may involve use of one or more mold forms. A mold form may be used to form the hollow region of a protrusion. A mold form may be of a length not substantially less than a width of the tile. A mold form may be of a length not substantially less than a distance between two facing edges of the tile. The mold form may have a mold form cross-section perpendicular to the length of the mold form. The mold form cross-section may be similar to the cross-section of the hollow region. The mold form cross-section may determine the cross-section of the hollow region. The mold forms may be core-removing cylinders.

The mold forms may be oriented in a plane parallel to opposable first and second ends of a mold press.

The first end of the mold press may include a mold shape of the top texture. The first end of the mold press may include a mold shape of at least part of the thickness of upper level. The first end of the mold press may include, along edges of the thickness, mold shapes of at least part of the interlock features.

The second end of the mold press may include mold shapes for the protrusions. The second end of the mold press may include mold shapes for the inter-protrusion ribs. The second end of the mold press may include mold shapes for the interlock ledge support ribs. The second end of the mold press may include mold shapes for the lower level. The second end of the mold press may include a mold shape of at least part of the thickness of the upper level. The second end of the mold press may include, along edges of the thickness, mold shapes of at least part of the interlock features.

Insertion of moldable material, such as rubber, into the mold press when the opposable ends are closed together, with the one or more mold forms parallel to and between the opposable ends, may result in a molded rough-form of the tile. The molded rough-form may resemble the tile, but has one or more mold forms lying between the upper and lower levels of the molded tile.

Removal of a mold form from the rough-form in a direction parallel to the top surface, may leave in the tile, between the upper and lower levels, the hollow region of the protrusion. Removal of the mold form from the rough-form in the direction parallel to the top surface may leave in the tile, between the upper and lower levels, the facing openings to the hollow region.

BRIEF DESCRIPTION OF THE DRAWINGS

The objects and advantages of the invention will be apparent upon consideration of the following detailed description, taken in conjunction with the accompanying line drawings, in which like reference characters refer to like parts throughout, and in which.

DETAILED DESCRIPTION OF THE DISCLOSURE

Figure 1:
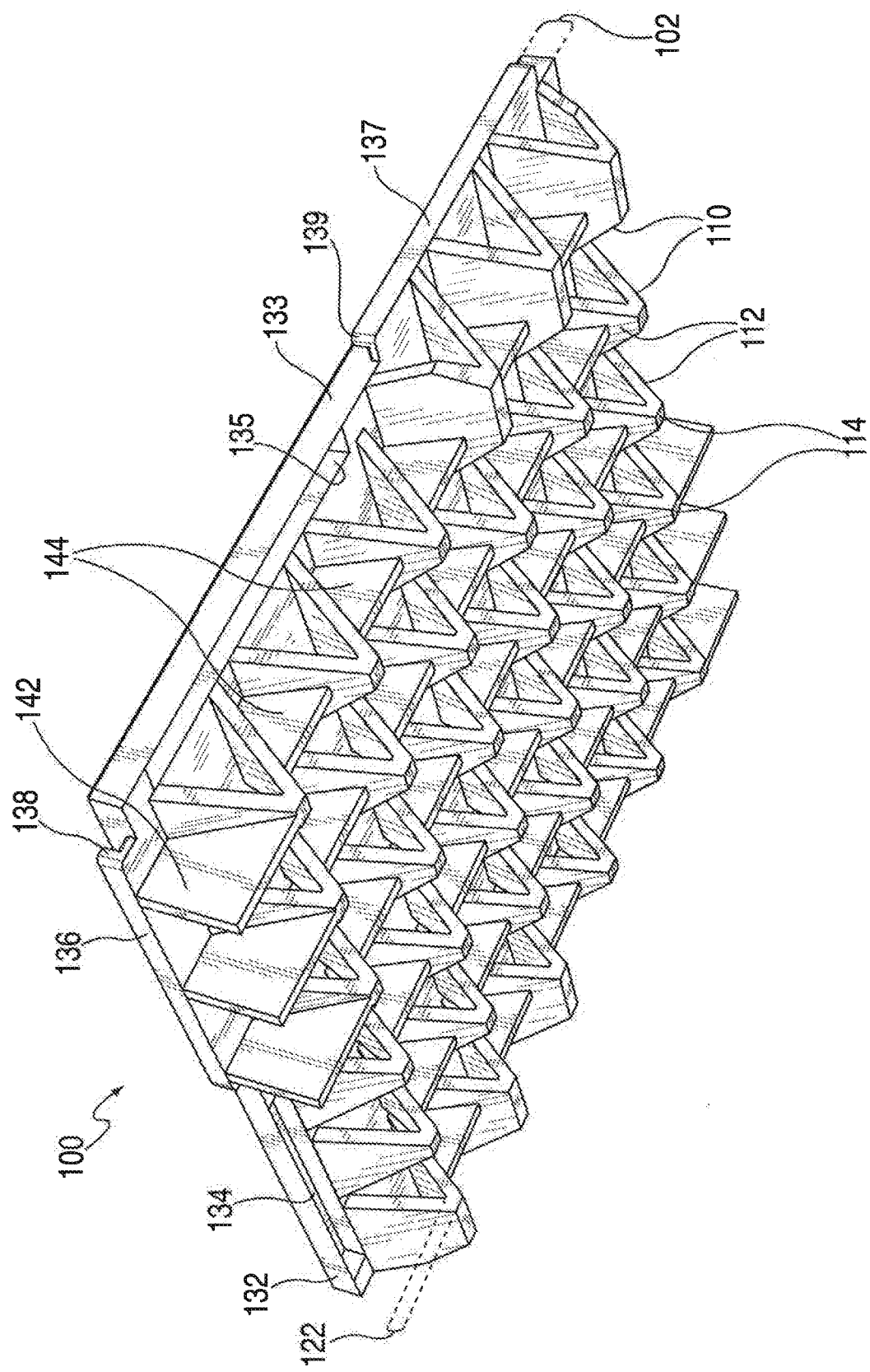
FIG. 1 is a bottom perspective view of a multi-level unitary safety surface tile in accordance with principles of the invention.

Apparatus and methods for making playgrounds and related areas safe are provided. The apparatus may include, and the methods may involve, components and processes that make safe playgrounds.

The components may include a multi-level unitary safety surface tile. The processes may include methods of manufacturing the multi-level unitary safety surface tile. The multi-level unitary safety surface tile may serve as a component of a unitary safety surface for a playground or related area.

The tile may be configured to attenuate impact force. The tile may be disposed upon a substrate underlayer characterized and prepared as described above. When the tile is disposed upon the underlayer, the tile may attenuate impact force from above. An illustrative tile may have ASTM testing results at typical temperatures at 12 feet, of a Head Injury Criteria (HIC) value of under 700 and 123 Gmax.

The tile may include an upper tile level. The upper level may include a substantially flat top surface. The upper level may include a textured top surface. Opposite the top surface, the upper tile level may include a bottom surface. The upper tile level may have a thickness. The thickness may lie between the top surface and the bottom surface. The thickness may be substantially uniform.

In the illustrative tile, the upper level may be about 1 inch thick. The thickness may be greater than about one inch. The thickness may be less than about one inch.

In the illustrative tile, the upper level may be substantially square, with a side of about 24 inches. Tile length and tile width may be different. The length may be more than about 24 inches. The length may be less than about 24 inches. The width may be more than about 24 inches. The width may be less than about 24 inches. The upper level may be non-rectilinear.

The illustrative tile may include at least six hollow protrusions disposed below the upper tile level. The number of protrusions may be more than six; for example, the number of protrusions may be 36. A tile of length and/or width smaller than 24 inches may have fewer than six protrusions.

The protrusions may extend from the upper level opposite the top surface.

Each protrusion may include at least two resilient walls. The walls may be smooth. The walls may be corrugated. The walls may be straight. The walls may be curved.

The walls of a protrusion may converge away from the upper tile level. The walls may converge to form a lower tile level. Between the upper level and the lower level, the walls of a protrusion may define two openings. The openings may face each other. The openings may access a hollow region within the hollow protrusion.

The walls may converge to a bottom-cap. The bottom-cap may be part of the lower level. The walls may face each other. The walls may extend from the bottom surface of the upper level to the bottom-cap. The walls may converge toward each other in extending from the bottom surface of the upper level to the bottom-cap.

In illustrative tiles, a bottom surface of the bottom-cap may approximate a round-cornered square. Such tiles may feature several protrusions in a row across the bottom surface of the upper level, each protrusion having a pair of facing openings. Such protrusions may have the shape of inverted, flat-top, open-sided pyramids. A side of the square may be about ½ inch. The side of the square may be less than about ½ inch. The side of the square may be more than ½ inch. For example, the side of the square may be 1.5 inches.

The bottom surface of the bottom-cap may not be square. The bottom surface of the bottom-cap may be of any shape. Any shape may include circular. In illustrative tiles, the bottom surface of the bottom-cap may approximate an elongated rectangle. The rectangle may about a ½ inch in width. In length, the rectangle may extend across almost all the bottom surface of the upper level. The walls converging on such a bottom-cap may extend laterally between the bottom-cap and bottom surface of the upper level across almost all the bottom surface of the upper level. Such a protrusion may have a pair of facing opening, with the openings laterally separated by almost the full length of the upper level.

The lower tile level may be configured to be disposed upon the underlayer. The lower tile level may be disposed upon the underlayer.

When the tile is not subject to impact force, the lower tile level may be disposed substantially at a preset distance from the upper tile level.

In the illustrative tile, a tile height between a bottom surface of the lower level and the top surface of the upper level may be about 3.5 inches (with the tile not subject to impact force). Tile height may be more than about 3.5 inches. Tile height may be less than about 3.5 inches.

The tile may include a plurality of tile edges. At least one of the tile edges may include an interlock. The interlock may engage a complementary structural element of another tile that may be disposed adjoining the tile edge-to-edge, both tiles serving as components of the unitary safety surface. The edge may include more than one type of interlock; for example, an edge may include a male interlock feature and a female interlock feature. The edge may include more than one of a given type of interlock feature. The complementary structural element of the other tile may be a hollow protrusion of the other tile.

The tile may include a rib spanning facing walls of adjacent protrusions. Such inter-protrusion ribs may support the protrusions.

The tile may include a rubbery material. The tile may be made of as single material. The tile may be made of several materials blended together. The material(s) may be homogeneous. The material may include rubber. The rubber may be natural rubber and/or synthetic rubber, whether recycled or virgin. The material may include styrene-butadiene rubber ("SBR"). The material may include ethylene propylene diene monomer terpolymer rubber ("EPDM"). The material may include any suitable material. Any suitable material may include nitrile butadiene rubber ("NBR"). The material may be vulcanized. The material may be vulcanized from rubber sheets. The material may be bonded with urethane and rubber granules. Shore A hardness of the material may be between 50 and 80.

A method of manufacturing the multi-level unitary safety surface tile may include positioning one or more mold forms in a plane. The method of manufacturing the multi-level unitary safety surface tile may include positioning at least six mold forms in a plane. The forms may be positioned parallel to each other in the plane. The forms may be positioned equispaced in the plane. The plane may lie between opposable faces of a mold press. The plane may lie substantially parallel to the opposable faces of the mold press. For example, if the mold press closes vertically, bring together two substantially horizontal faces, the plane may be horizontal. The mold forms may be core-removing cylinders.

The method may include closing the mold press. The method may include injecting material into the mold press to form molded material.

The method may include removing each mold form from the molded material. Removing a mold form from the molded material may remove a core of material from the molded material. Removing a mold form from the molded material may leave hollow at least one protrusion in the molded material. The protrusion may protrude from an upper tile level of the molded material. The protrusion may include walls converging away from the upper tile level to form a lower tile level. The walls may defining two openings in the protrusion between the upper tile level and the lower tile level. The openings may be left by removing the mold form to form the hollow of the protrusion.

The multi-level unitary safety surface tile formed may be a one-piece rubber casting. The multi-level unitary safety surface tile formed may be a one-piece rubber molding.

The multi-level unitary safety surface tile formed may require no further additive manufacturing steps. The manufacturing process may confer all features needed for the tile to be functional in the unitary safety surface.

The multi-level unitary safety surface tile formed may require further subtractive manufacturing steps to be functional in the unitary safety surface. The manufacturing process may leave excess material on the tile. The excess may require trimming prior to the tile being used in the unitary safety surface.

Apparatus and methods in accordance with the invention will now be described in connection with the figures. The figures show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown and described herein. Some embodiments may omit steps shown and described in connection with the illustrative methods. Some embodiments may include steps that are not shown and/or not described in connection with the illustrative methods.

Illustrative embodiments will now be described with reference to the accompanying drawings, which form a part hereof.

The apparatus and methods of the invention will be described in connection with embodiments and features of illustrative devices. The devices will be described now with reference to the figures. It is to be understood that other embodiments may be utilized and that structural, functional and procedural modifications may be made without departing from the scope and spirit of the present invention.

FIG. 1 shows multi-level unitary safety surface tile 100. Tile 100 may be substantially rectilinear. Tile 100 may be substantially rectangular. Tile 100 may be substantially square.

Tile 100 may include upper level 102. Tile 100 may include protrusions 110. Protrusions 110 may extend away from upper level 102. A protrusion 110 may include walls 112. A protrusion 110 may include bottom-cap 114. Walls 112 of a protrusion 110 may converge away from upper level 102. Walls 112 of protrusion 110 may converge toward bottom-cap 114.

Tile 100 may include lower level 122. Lower level 122 may include bottom-caps 114. Lower level 122 may be disposed upon the underlayer (not shown). Tile 100 may be disposed upon the underlayer such that lower level 122 rests upon the underlayer. Tile 100 may be disposed upon the underlayer such that bottom-caps 114 rest upon the underlayer.

Tile 100 may include front proximal ledge 132. Ledge 132 may include interlock feature 134. Interlock feature 134 may include an interlock trough.

Tile 100 may include front distal ledge 136. Ledge 136 may include interlock feature 138. Interlock feature 138 may include an interlock tongue.

Tile 100 may include side proximal ledge 133. Ledge 133 may include interlock feature 135. Interlock feature 135 may include an interlock trough.

Tile 100 may include side distal ledge 137. Ledge 137 may include interlock feature 139. Interlock feature 139 may include an interlock tongue. Ledge 137 may be supported by one, or more than one, protrusion 110.

Ledge 136 may be supported by one, or more than one, interlock support rib 142. Rib 142 may extend away from ledge 136. Rib 142 may be supported from below. A bottom surface of rib 142 may be disposed upon the underlayer (not shown). Tile 100 may be disposed upon the underlayer such that the bottom surface of rib 142 rests upon the underlayer. Lower level 122 may include the bottom surface of rib 142.

A second multi-level unitary safety surface tile (not shown) substantially similar to tile 100 may be disposed upon the underlayer (not shown). The second tile may be adjoined to tile 100 such that interlock feature 134 may accept and hold an interlock tongue of the second tile similar to interlock feature 139 or to interlock feature 138. Similarly, interlock feature 138 may be accepted and held by an interlock trough of the second tile similar to interlock feature 135 or to interlock feature 134.

Tile 100 may include inter-protrusion rib 144. Rib 144 may support adjacent protrusions 110. Rib 144 may strengthen adjacent protrusions 110. Rib 144 may increase impact attenuation of adjacent protrusions 110. Rib 144 may increase impact attenuation of tile 100.

Rib 144 may span a gap between adjacent protrusions 110. Between adjacent protrusions 110, upper level 102 may bear a side of rib 144. Between adjacent protrusions 110, a bottom surface of upper level 102 may be continuous with the side of rib 144. Rib 144 may extend away from upper level 102. Rib 144 may have an extension away from upper level 102. Rib 144 may span a gap between facing walls 112 of adjacent protrusions 110. A side of rib 144 may be continuous with wall 112 along the extension of rib 144 away from upper level 102.

Rib 144 may extend toward lower level 122. Rib 144 may have an extension toward lower level 122. A side of rib 144 may be continuous with wall 112 along the extension of rib 144 toward lower level 122. Rib 144 may extend from upper level 102 toward lower level 122. Rib 144 may extend between upper level 102 and lower level 122. Rib 144 may extend completely from upper level 102 to lower level 122. Rib 144 may extend partially from upper level 102 toward lower level 122.

Rib 144 may have a thickness that is uniform over the extension of rib 144 between upper level 102 and lower level 122. Rib 144 may have a thickness that is non-uniform over the extension of rib 144 between upper level 102 and lower level 122. Rib 144 may have a thickness that decreases along the extension of rib 144 from upper level 102 toward lower level 122.

Figure 2:
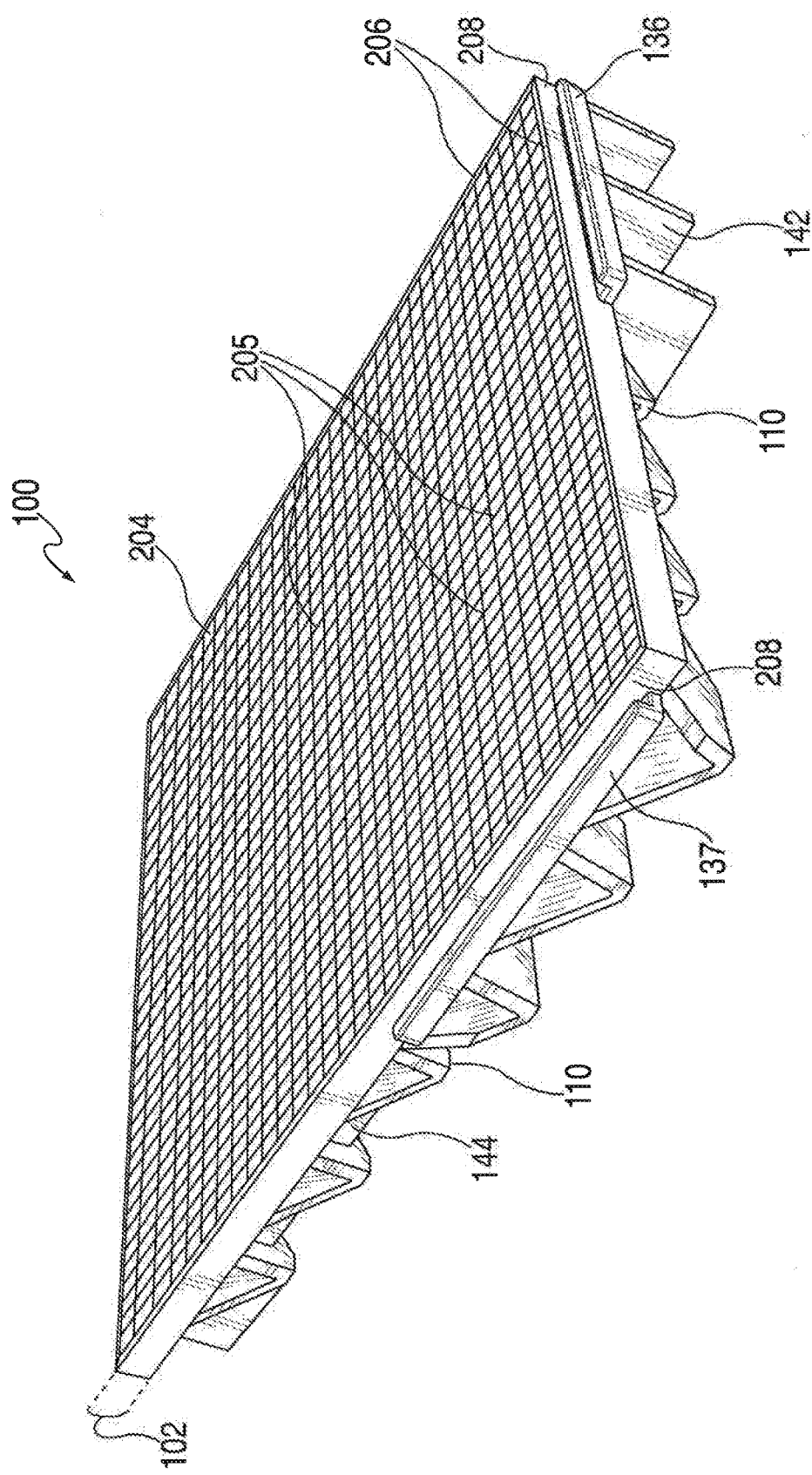
FIG. 2 is a top perspective view of the multi-level unitary safety surface tile shown in FIG. 1.

FIG. 2 shows upper level 102 of tile 100, with protrusions 110 extending downward away from upper level 102 and with rib 144 spanning the gap between adjacent protrusions 110.

Upper level 102 may have an edge 208. Edge 208 may be part of a perimeter of tile 100. Edge 208 may extend along all the perimeter. Ledge 137 may extend from edge 208. Ledge 136 may extend from edge 208. Rib 142 may extend downward away from ledge 136. Rib 142 may extend laterally away from protrusion 110.

Upper level 102 may have a top surface 204. Surface 204 may be substantially perpendicular to edge 208. Surface 204 may be coterminous with a surface area of upper level 102 within the perimeter. Surface 204 may lie upon all the area within edge 208.

Surface 204 may feature a texture 205. Texture 205 may be coterminous with surface 204. Texture 205 may be less extensive in area than surface 204. Surface 204 may contain a border 206. Border 206 may lie between texture 205 and edge 208. Border 206 may serve as a bevel between surface 204 and edge 208. Border 206 may be texture-less.

Figure 3:
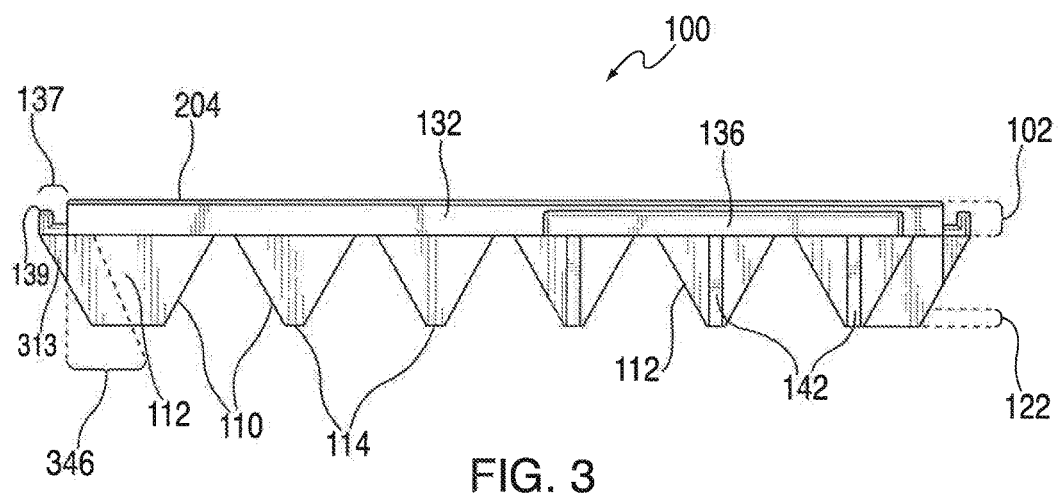
FIG. 3 is a front elevational view of the multi-level unitary safety surface tile shown in FIG. 1.

FIG. 3 shows protrusions 110 of tile 100 extending downward from upper level 102, opposite top surface 204, to lower level 122. (In the front view provided by FIG. 3, depicted wall 112 of protrusion 110 lies in the foreground and obscures a view of a facing wall 112 of protrusion 110 lying in the background.) Rib 142 may extend laterally from protrusion 110 and may extend downward from upper level 102 to lower level 122. Lower level 122 may include bottom-caps 114 and the bottom surface of ribs 142.

Ledge 132 and ledge 136 may extend laterally from upper level 102. Rib 142 may extend downward from ledge 136 to lower level 122. With tile 100 disposed with lower layer 122 resting on the underlayer (not shown), rib 142 may support ledge 136 from below.

Ledge 137 may extend laterally from upper level 102. A protrusion 110 may feature truncated extension 346. Truncated extension 346 may include a lateral extension, between upper level 102 and lower level 122, of a foreground wall 112 of that protrusion 110 toward ledge 137. Truncated extension 346 may lie coplanar with foreground wall 112. Ledge 137 lying in the background of the front view provided by FIG. 3, truncated extension 346 may not extend under ledge 137.

An inner surface 313 of a background wall 112 (obscured by foreground wall 112) of that protrusion 110 may extend under ledge 137. With tile 100 disposed with lower layer 122 resting on the underlayer (not shown), that protrusion 110 may support ledge 137 from below. Support of ledge 137 may support interlock feature 139. Support of interlock feature 139 may support a complementary interlock feature of the second multi-level unitary safety surface tile (not shown) substantially similar to tile 100, the second tile adjoined to tile 100.

Figure 4:
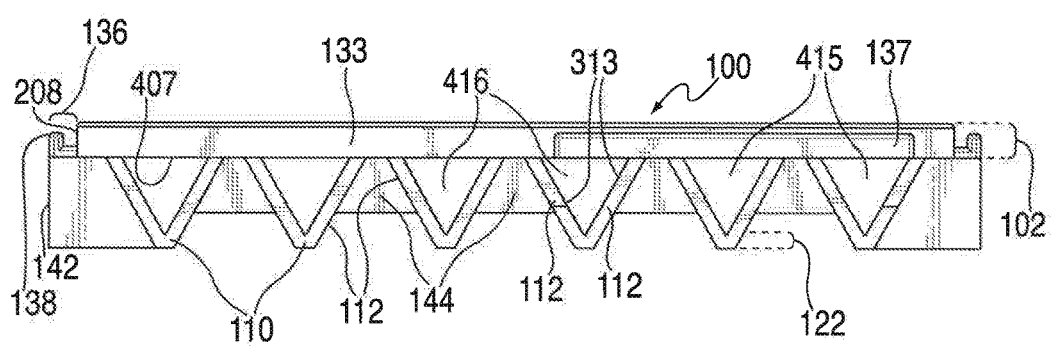
FIG. 4 is a right elevational view of the multi-level unitary safety surface tile shown in FIG. 1.

FIG. 4 shows a bottom surface 407 of upper level 102 of tile 100. Protrusions 110 may extend downward between bottom surface 407 and lower level 122. Ribs 144 may support walls 112 of adjacent protrusions 110.

Ledge 136 may extend laterally from edge 208. Rib 142 may extend laterally under ledge 136. Rib 142 may extend downward from ledge 136 and may extend downward between bottom surface 407 and lower level 122. With tile 100 disposed with lower layer 122 resting on the underlayer (not shown), rib 142 may support ledge 136 from below. Support of ledge 136 may support interlock feature 138. Support of interlock feature 138 may support a complementary interlock feature of the second multi-level unitary safety surface tile (not shown) substantially similar to tile 100, the second tile adjoined to tile 100.

Ledge 133 and ledge 137 may extend laterally from edge 208. Ledge 137 may be supported from below by one or more protrusions 110 extending under ledge 137.

Bottom surface 407 may extend above and across protrusions 110. Bottom surface 407 and inner surface 313 of walls 112 of a protrusion may bound a hollow region 415. A region 415 may lie within a protrusion 110. Regions 415 may lie within protrusions 110. Bottom surface 407 and walls 112 of a protrusion 110 may define a first opening 416 to the protrusion's region 415. The side view provided by FIG. 4 obscures a second opening to region 415. The second opening (not shown) may face the first opening.

Figure 5:
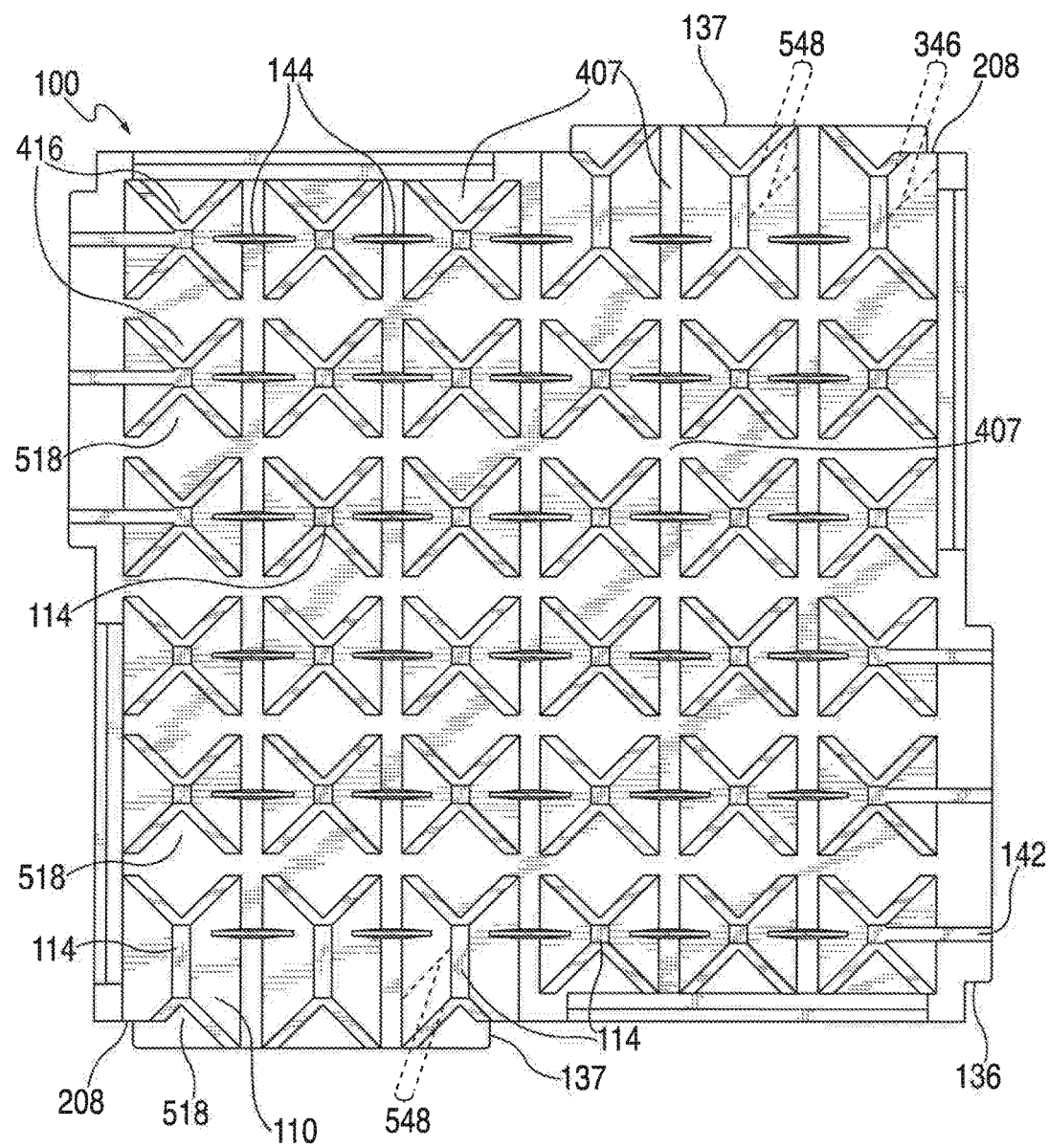
FIG. 5 is a bottom plan view of the multi-level unitary safety surface tile shown in FIG. 1.

FIG. 5 shows tile 100 with second openings 518 of protrusions 110 facing first openings 416 of protrusions 110. Protrusions 110 may extend between bottom surface 407 and bottom-caps 114 and may be braced by ribs 144.

Ledge 136 may extend laterally from edge 208 and may be supported by rib 142 extending from a protrusion 110.

Ledge 137 may extend from edge 208 and may be supported by untruncated extension 548. Untruncated extension 548 may include a lateral extension of a protrusion 110 toward an edge of ledge 137 distal and parallel to edge 208. Untruncated extension 548 may extend beyond truncated extension 346. Truncated extension 346 may not extend to the edge of ledge 137 distal and parallel to edge 208. Truncated extension 346 may extend to edge 208.

With tile 100 disposed with bottom-caps 114 resting on the underlayer (not shown), protrusions 110 featuring untruncated extension 548 may support ledge 137 from below.

Figure 6:
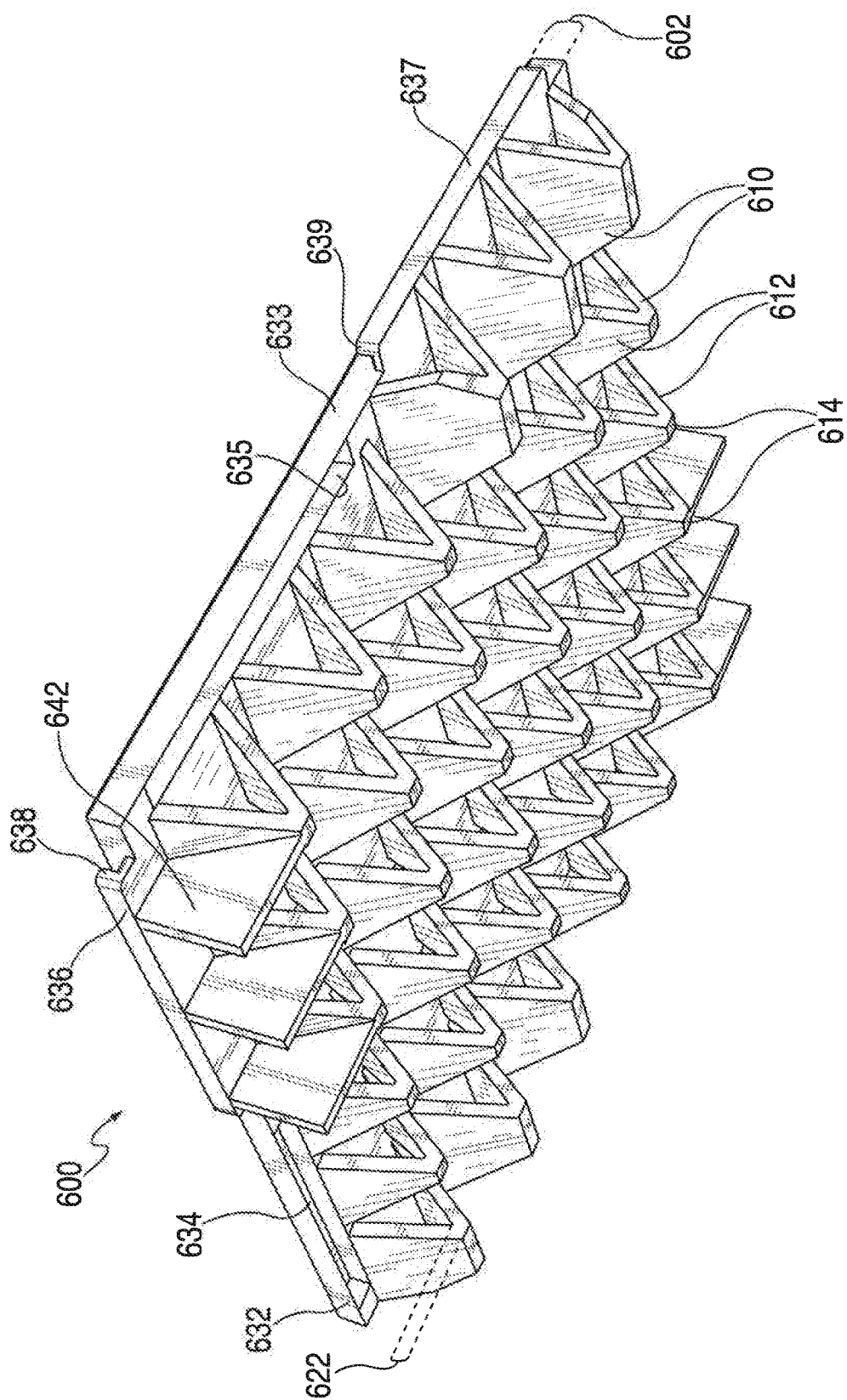
FIG. 6 is a bottom perspective view of a multi-level unitary safety surface tile in accordance with principles of the invention.

FIG. 6 shows multi-level unitary safety surface tile 600. Tile 600 may have none, some or all of the features and functions of tile 100 (shown in FIGS. 1-5).

Tile 600 may be substantially rectilinear. Tile 600 may be substantially rectangular. Tile 600 may be substantially square.

Tile 600 may include upper level 602. Tile 600 may include protrusions 610. Protrusions 610 may extend away from upper level 602. A protrusion 610 may include walls 612. A protrusion 610 may include bottom-cap 614. Walls 612 of a protrusion 610 may converge away from upper level 602. Walls 612 of protrusion 610 may converge toward bottom-cap 614.

Tile 600 may include lower level 622. Lower level 622 may include bottom-caps 614. Lower level 622 may be disposed upon the underlayer (not shown). Tile 600 may be disposed upon the underlayer such that lower level 622 rests upon the underlayer. Tile 600 may be disposed upon the underlayer such that bottom-caps 614 rest upon the underlayer.

Tile 600 may include front proximal ledge 632. Ledge 632 may include interlock feature 634. Interlock feature 634 may include an interlock trough.

Tile 600 may include front distal ledge 636. Ledge 636 may include interlock feature 638. Interlock feature 638 may include an interlock tongue.

Tile 600 may include side proximal ledge 633. Ledge 633 may include interlock feature 635. Interlock feature 635 may include an interlock trough.

Tile 600 may include side distal ledge 637. Ledge 637 may include interlock feature 639. Interlock feature 639 may include an interlock tongue. Ledge 637 may be supported by one, or more than one, protrusion 610.

Ledge 636 may be supported by one, or more than one, interlock support rib 642. Rib 642 may extend away from ledge 636. Rib 642 may be supported from below. A bottom surface of rib 642 may be disposed upon the underlayer (not shown). Tile 600 may be disposed upon the underlayer such that the bottom surface of rib 642 rests upon the underlayer. Lower level 622 may include the bottom surface of rib 642.

A second multi-level unitary safety surface tile (not shown) substantially similar to tile 600 (or to tile 100 shown in FIG. 1) may be disposed upon the underlayer (not shown). The second tile may be adjoined to tile 600 such that interlock feature 634 may accept and hold an interlock tongue of the second tile similar to interlock feature 639 or to interlock feature 638. Similarly, interlock feature 638 may be accepted and held by an interlock trough of the second tile similar to interlock feature 635 or to interlock feature 634.

Figure 7:
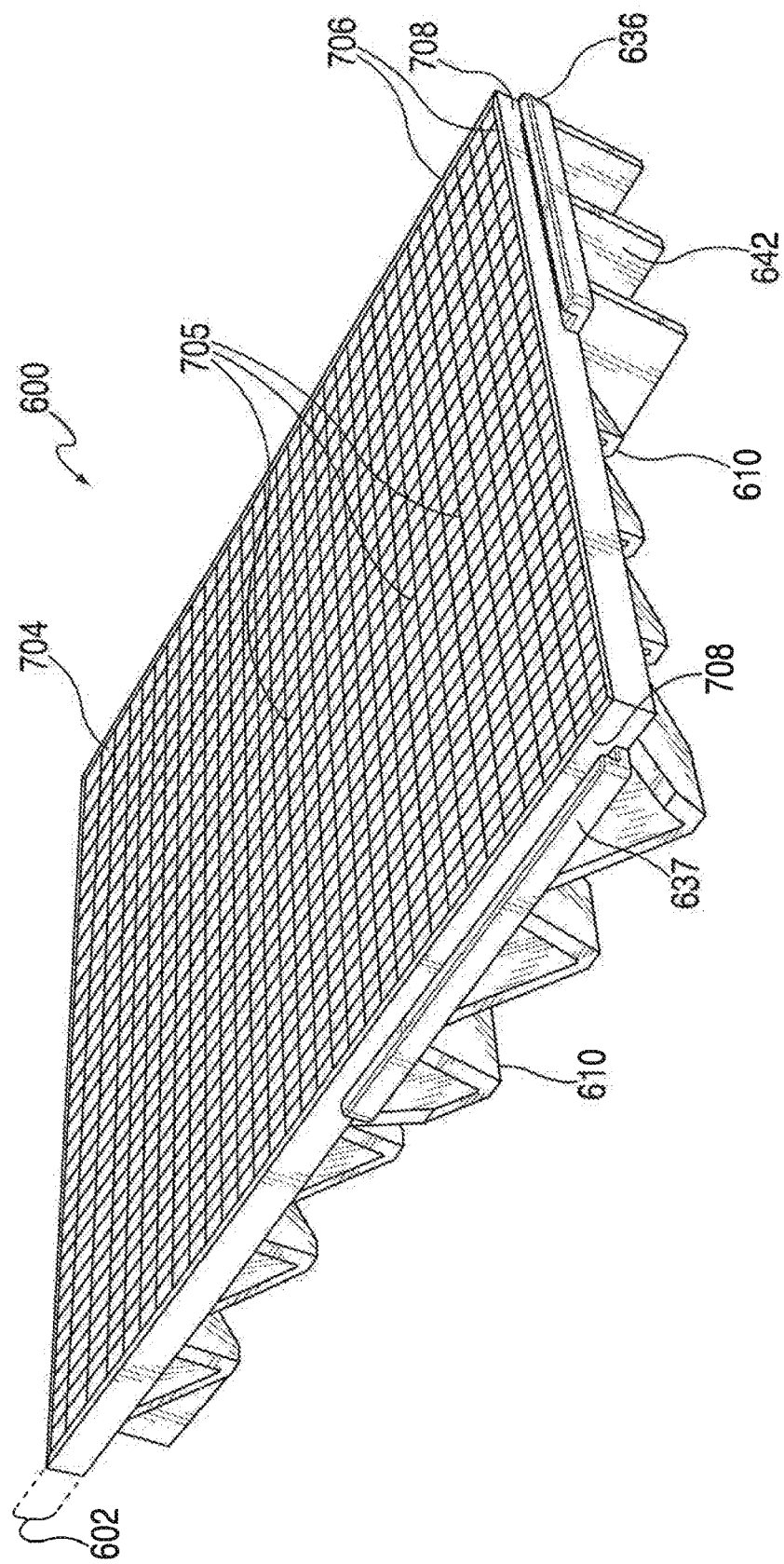
FIG. 7 is a top perspective view of the multi-level unitary safety surface tile shown in FIG. 6.

FIG. 7 shows upper level 602 of tile 600, with protrusions 610 extending downward away from upper level 602.

Upper level 602 may have an edge 708. Edge 708 may be part of a perimeter of tile 600. Edge 708 may extend along all the perimeter. Ledge 637 may extend from edge 708. Ledge 636 may extend from edge 708. Rib 642 may extend downward away from ledge 636. Rib 642 may extend laterally away from protrusion 610.

Upper level 602 may have a top surface 704. Surface 704 may be substantially perpendicular to edge 708. Surface 704 may be coterminous with a surface area of upper level 602 within the perimeter. Surface 704 may lie upon all the area within edge 708.

Surface 704 may feature a texture 705. Texture 705 may be coterminous with surface 704. Texture 705 may be less extensive in area than surface 704. Surface 704 may contain a border 706. Border 706 may lie between texture 705 and edge 708. Border 706 may serve as a bevel between surface 704 and edge 708. Border 706 may be texture-less.

Figure 8:
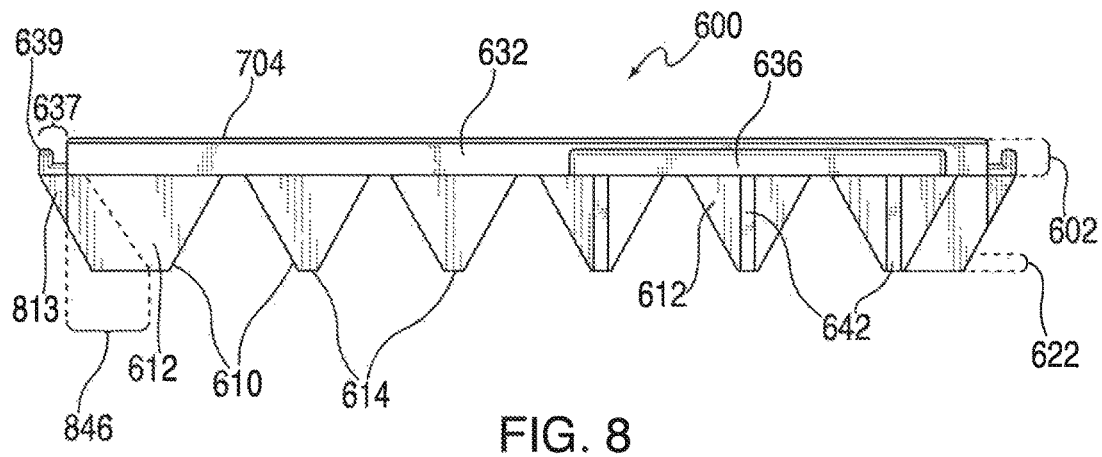
FIG. 8 is a front elevational view of the multi-level unitary safety surface tile shown in FIG. 6.

FIG. 8 shows protrusions 610 of tile 600 extending downward from upper level 602, opposite top surface 704, to lower level 622. (In the front view provided by FIG. 8, depicted wall 612 of protrusion 610 lies in the foreground and obscures a view of a facing wall 612 of protrusion 610 lying in the background.) Rib 642 may extend laterally from protrusion 610 and may extend downward from upper level 602 to lower level 622. Lower level 622 may include bottom-caps 614 and the bottom surface of ribs 642.

Ledge 632 and ledge 636 may extend laterally from upper level 602. Rib 642 may extend downward from ledge 636 to lower level 622. With tile 600 disposed with lower layer 622 resting on the underlayer (not shown), rib 642 may support ledge 636 from below.

Ledge 637 may extend laterally from upper level 602. A protrusion 610 may feature truncated extension 846. Truncated extension 846 may include a lateral extension, between upper level 602 and lower level 622, of a foreground wall 612 of that protrusion 610 toward ledge 637. Truncated extension 846 may lie coplanar with foreground wall 612. Ledge 637 lying in the background of the front view provided by FIG. 8, truncated extension 846 may not extend under ledge 637.

An inner surface 813 of a background wall 612 (obscured by foreground wall 612) of that protrusion 610 may extend under ledge 637. With tile 600 disposed with lower layer 622 resting on the underlayer (not shown), that protrusion 610 may support ledge 637 from below. Support of ledge 637 may support interlock feature 639. Support of interlock feature 639 may support a complementary interlock feature of the second multi-level unitary safety surface tile (not shown) substantially similar to tile 600, the second tile adjoined to tile 600.

Figure 9:
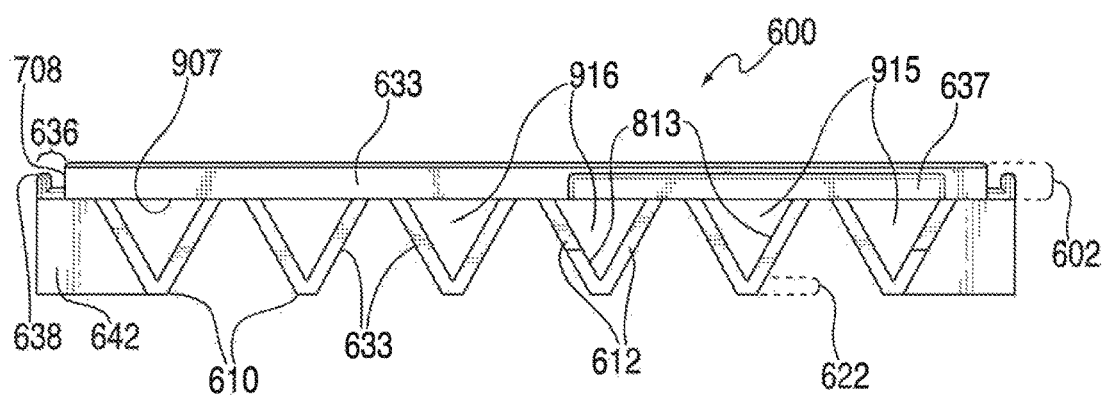
FIG. 9 is a right elevational view of the multi-level unitary safety surface tile shown in FIG. 6.

FIG. 9 shows a bottom surface 907 of upper level 602 of tile 600. Protrusions 610 may extend downward between bottom surface 907 and lower level 622.

Ledge 636 may extend laterally from edge 708. Rib 642 may extend laterally under ledge 636. Rib 642 may extend downward from ledge 636 and may extend downward between bottom surface 907 and lower level 622. With tile 600 disposed with lower layer 622 resting on the underlayer (not shown), rib 642 may support ledge 636 from below. Support of ledge 636 may support interlock feature 638. Support of interlock feature 638 may support a complementary interlock feature of the second multi-level unitary safety surface tile (not shown) substantially similar to tile 600, the second tile adjoined to tile 600.

Ledge 633 and ledge 637 may extend laterally from edge 708. Ledge 637 may be supported from below by one or more protrusions 610 extending under ledge 637.

Bottom surface 907 may extend above and across protrusions 610. Bottom surface 907 and inner surface 813 of walls 612 of a protrusion may bound a hollow region 915. A region 915 may lie within a protrusion 610. Regions 915 may lie within protrusions 610. Bottom surface 907 and walls 612 of a protrusion 610 may define a first opening 916 to the protrusion's region 915. The side view provided by FIG. 9 obscures a second opening to region 915. The second opening (not shown) may face the first opening.

Figure 10:
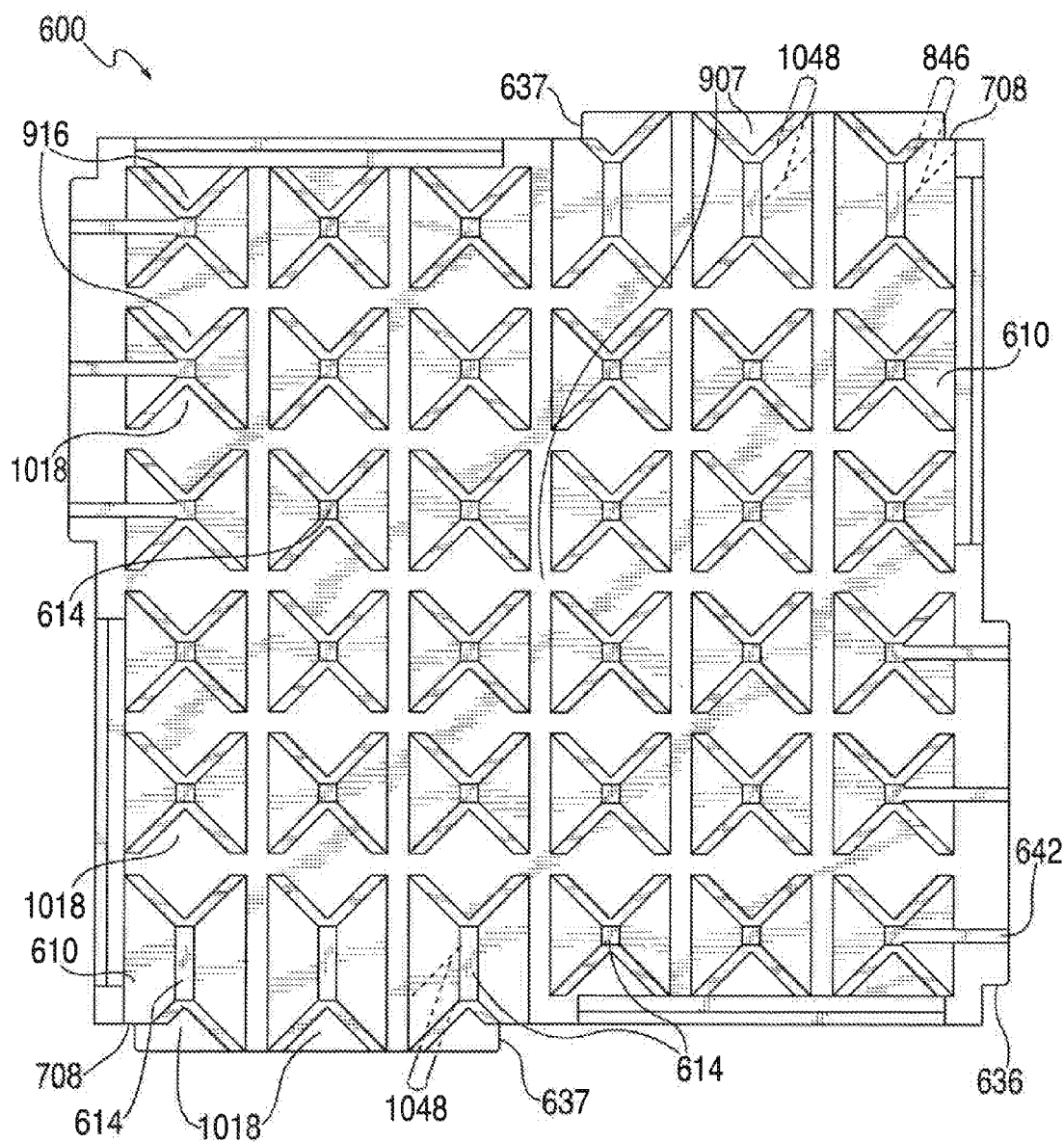
FIG. 10 is a bottom plan view of the multi-level unitary safety surface tile shown in FIG. 6.

FIG. 10 shows tile 600 with second openings 1018 of protrusions 610 facing first openings 916 of protrusions 610. Protrusions 610 may extend between bottom surface 907 and bottom-caps 614.

Ledge 636 may extend laterally from edge 708 and may be supported by rib 642 extending from a protrusion 610.

Ledge 637 may extend from edge 708 and may be supported by untruncated extension 1048. Untruncated extension 1048 may include a lateral extension of a protrusion 610 toward an edge of ledge 637 distal and parallel to edge 708. Untruncated extension 1048 may extend beyond truncated extension 846. Truncated extension 846 may not extend to the edge of ledge 637 distal and parallel to edge 708. Truncated extension 846 may extend to edge 708.

With tile 600 disposed with bottom-caps 614 resting on the underlayer (not shown), protrusions 610 featuring untruncated extension 1048 may support ledge 637 from below.

Figure 11:
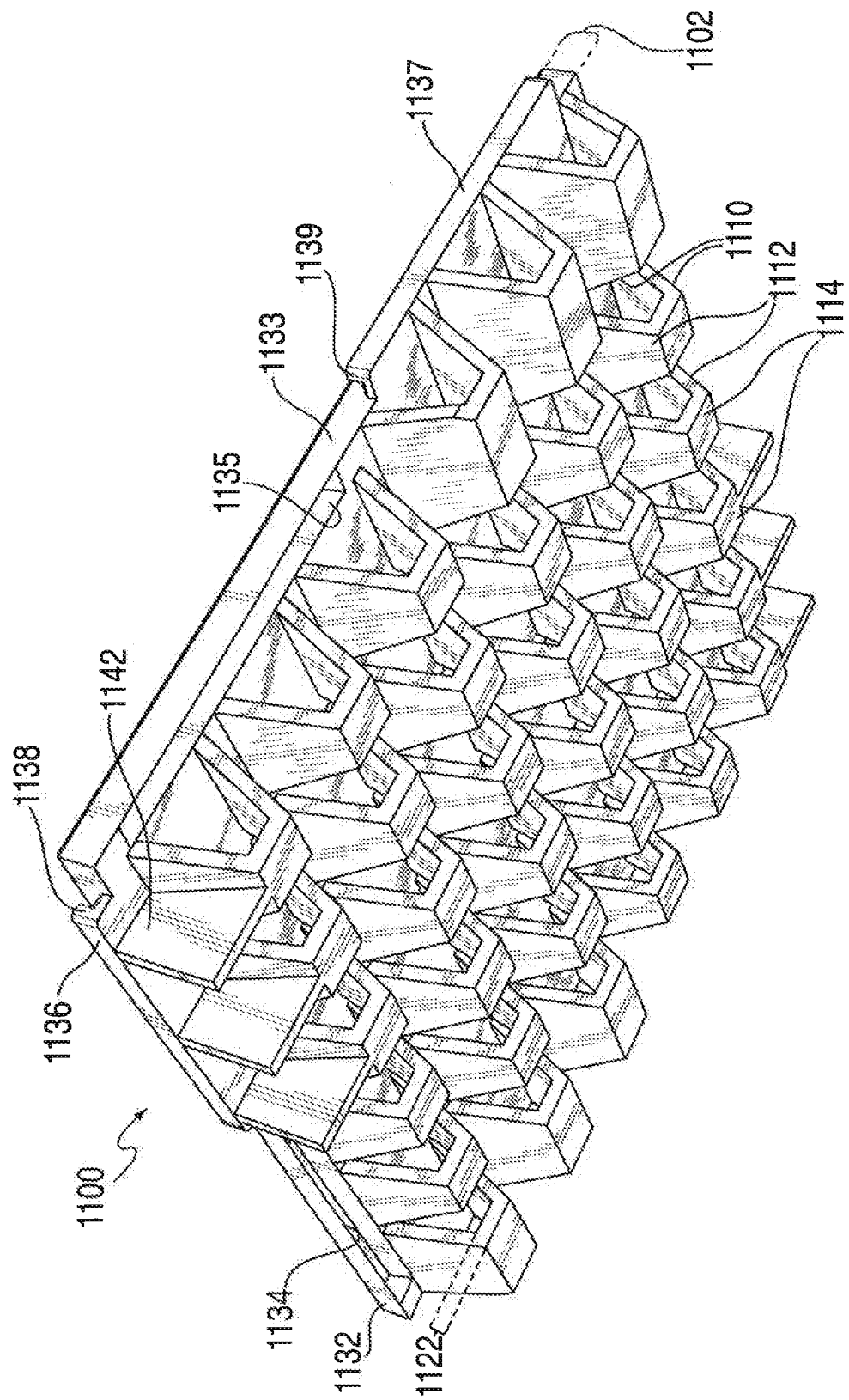
FIG. 11 is a bottom perspective view of a multi-level unitary safety surface tile in accordance with principles of the invention.

FIG. 11 shows multi-level unitary safety surface tile 1100. Tile 1100 may have none, some or all of the features and functions of tile 100 (shown in FIGS. 1-5). Tile 1100 may have none, some or all of the features and functions of tile 600 (shown in FIGS. 6-10).

Tile 1100 may be substantially rectilinear. Tile 1100 may be substantially rectangular. Tile 1100 may be substantially square.

Tile 1100 may include upper level 1102. Tile 1100 may include protrusions 1110. Protrusions 1110 may extend away from upper level 1102. A protrusion 1110 may include walls 1112. A protrusion 1110 may include bottom-cap 1114. Walls 1112 of a protrusion 1110 may converge away from upper level 1102. Walls 1112 of protrusion 1110 may converge toward bottom-cap 1114.

Tile 1100 may include lower level 1122. Lower level 1122 may include bottom-caps 1114. Lower level 1122 may be disposed upon the underlayer (not shown). Tile 1100 may be disposed upon the underlayer such that lower level 1122 rests upon the underlayer. Tile 1100 may be disposed upon the underlayer such that bottom-caps 1114 rest upon the underlayer.

Tile 1100 may include front proximal ledge 1132. Ledge 1132 may include interlock feature 1134. Interlock feature 1134 may include an interlock trough.

Tile 1100 may include front distal ledge 1136. Ledge 1136 may include interlock feature 1138. Interlock feature 1138 may include an interlock tongue.

Tile 1100 may include side proximal ledge 1133. Ledge 1133 may include interlock feature 1135. Interlock feature 1135 may include an interlock trough.

Tile 1100 may include side distal ledge 1137. Ledge 1137 may include interlock feature 1139. Interlock feature 1139 may include an interlock tongue. Ledge 1137 may be supported by one, or more than one, protrusion 1110.

Ledge 1136 may be supported by one, or more than one, interlock support rib 1142. Rib 1142 may extend away from ledge 1136. Rib 1142 may be supported from below. A bottom surface of rib 1142 may be disposed upon the underlayer (not shown). Tile 1100 may be disposed upon the underlayer such that the bottom surface of rib 1142 rests upon the underlayer. Lower level 1122 may include the bottom surface of rib 1142.

A second multi-level unitary safety surface tile (not shown) substantially similar to tile 1100 (or to tile 100 shown in FIG. 1 or to tile 600 shown in FIG. 6) may be disposed upon the underlayer (not shown). The second tile may be adjoined to tile 1100 such that interlock feature 1134 may accept and hold an interlock tongue of the second tile similar to interlock feature 1139 or to interlock feature 1138. Similarly, interlock feature 1138 may be accepted and held by an interlock trough of the second tile similar to interlock feature 1135 or to interlock feature 1134.

Figure 12:
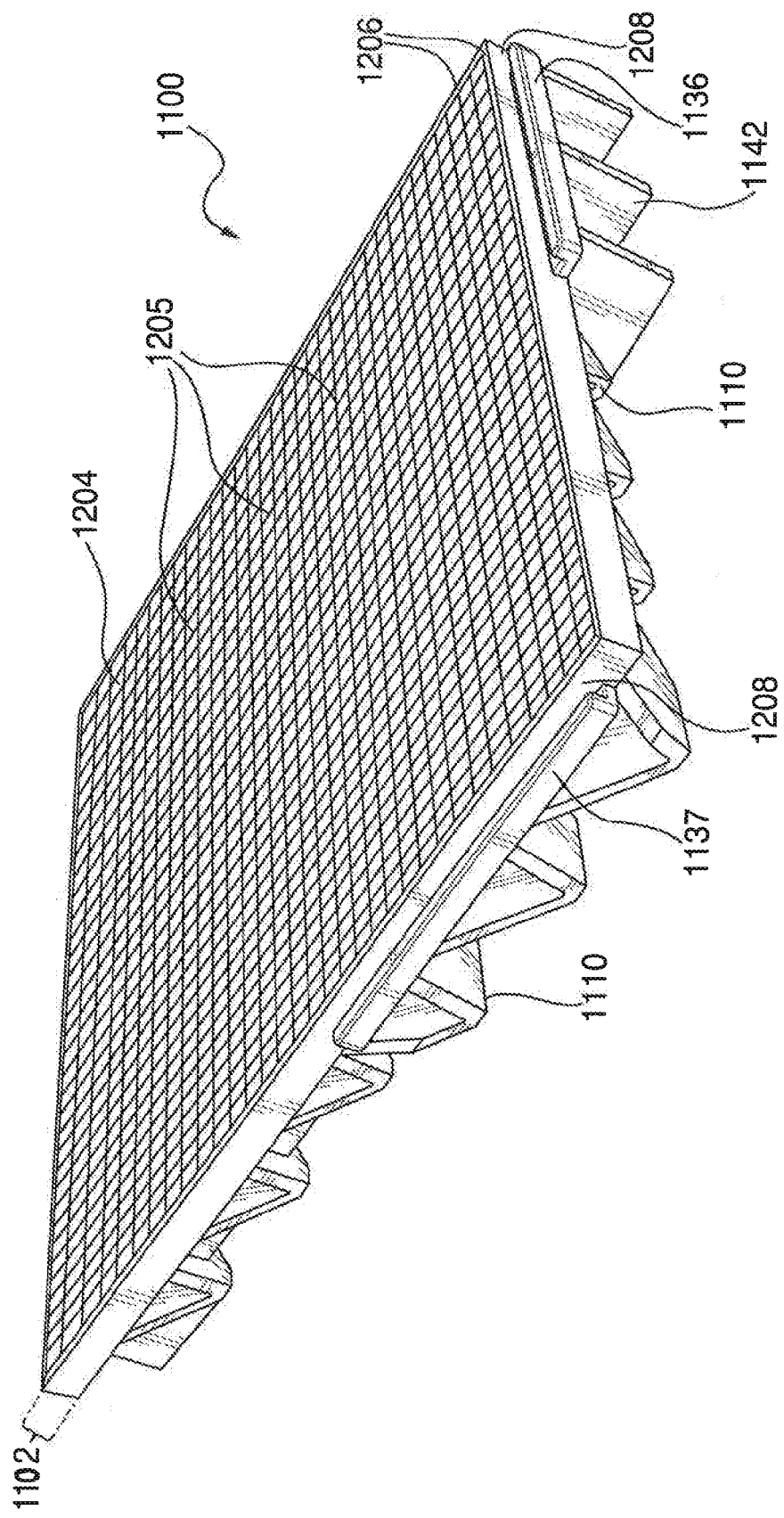
FIG. 12 is a top perspective view of the multi-level unitary safety surface tile shown in FIG. 11.

FIG. 12 shows upper level 1102 of tile 1100, with protrusions 1110 extending downward away from upper level 1102.

Upper level 1102 may have an edge 1208. Edge 1208 may be part of a perimeter of tile 1100. Edge 1208 may extend along all the perimeter. Ledge 1137 may extend from edge 1208. Ledge 1136 may extend from edge 1208. Rib 1142 may extend downward away from ledge 1136. Rib 1142 may extend laterally away from protrusion 1110.

Upper level 1102 may have a top surface 1204. Surface 1204 may be substantially perpendicular to edge 1208. Surface 1204 may be coterminous with a surface area of upper level 1102 within the perimeter. Surface 1204 may lie upon all the area within edge 1208.

Surface 1204 may feature a texture 1205. Texture 1205 may be coterminous with surface 1204. Texture 1205 may be less extensive in area than surface 1204. Surface 1204 may contain a border 1206. Border 1206 may lie between texture 1205 and edge 1208. Border 1206 may serve as a bevel between surface 1204 and edge 1208. Border 1206 may be texture-less.

Figure 13:
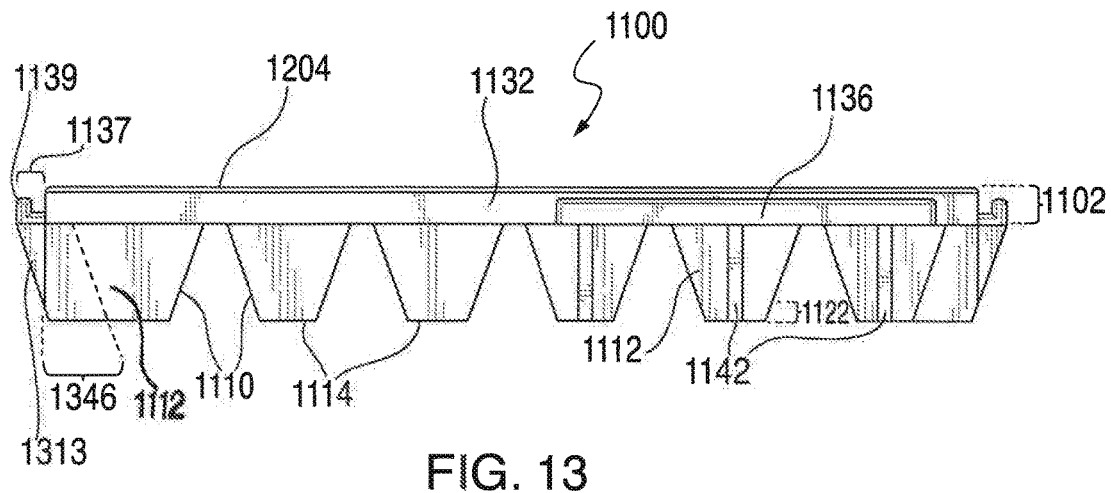
FIG. 13 is a front elevational view of the multi-level unitary safety surface tile shown in FIG. 11.

FIG. 13 shows protrusions 1110 of tile 1100 extending downward from upper level 1102, opposite top surface 1204, to lower level 1122. (In the front view provided by FIG. 13, depicted wall 1112 of protrusion 1110 lies in the foreground and obscures a view of a facing wall 1112 of protrusion 1110 lying in the background.) Rib 1142 may extend laterally from protrusion 1110 and may extend downward from upper level 1102 to lower level 1122. Lower level 1122 may include bottom-caps 1114 and the bottom surface of ribs 1142.

Ledge 1132 and ledge 1136 may extend laterally from upper level 1122. Rib 1142 may extend downward from ledge 1136 to lower level 1102. With tile 1100 disposed with lower layer 1122 resting on the underlayer (not shown), rib 1142 may support ledge 1136 from below.

Ledge 1137 may extend laterally from upper level 1102. A protrusion 1110 may feature truncated extension 1346. Truncated extension 1346 may include a lateral extension, between upper level 1102 and lower level 1122, of a foreground wall 1112 of that protrusion 1110 toward ledge 1137. Truncated extension 1346 may lie coplanar with foreground wall 1112. Ledge 1137 lying in the background of the front view provided by FIG. 13, truncated extension 1346 may not extend under ledge 1137.

An inner surface 1313 of a background wall 1112 (obscured by foreground wall 1112) of that protrusion 1110 may extend under ledge 1137. With tile 1100 disposed with lower layer 1122 resting on the underlayer (not shown), that protrusion 1110 may support ledge 1137 from below. Support of ledge 1137 may support interlock feature 1139. Support of interlock feature 1139 may support a complementary interlock feature of the second multi-level unitary safety surface tile (not shown) substantially similar to tile 1100, the second tile adjoined to tile 1100.

Figure 14:
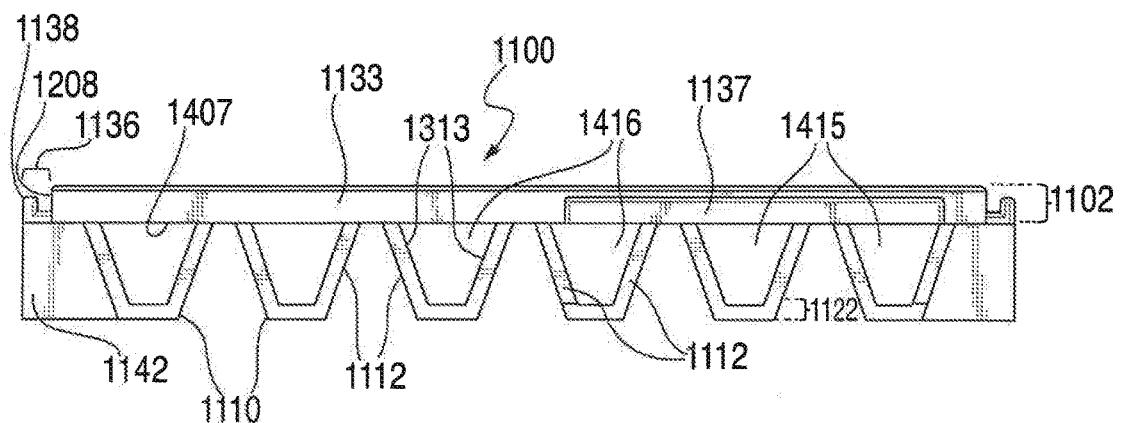
FIG. 14 is a right elevational view of the multi-level unitary safety surface tile shown in FIG. 11.

FIG. 14 shows a bottom surface 1407 of upper level 1102 of tile 1100. Protrusions 1110 may extend downward between bottom surface 1407 and lower level 1122.

Ledge 1136 may extend laterally from edge 1208. Rib 1142 may extend laterally under ledge 1136. Rib 1142 may extend downward from ledge 1136 and may extend downward between bottom surface 1407 and lower level 1122. With tile 1100 disposed with lower layer 1122 resting on the underlayer (not shown), rib 1142 may support ledge 1136 from below. Support of ledge 1136 may support interlock feature 1138. Support of interlock feature 1138 may support a complementary interlock feature of the second multi-level unitary safety surface tile (not shown) substantially similar to tile 1100, the second tile adjoined to tile 1100.

Ledge 1133 and ledge 1137 may extend laterally from edge 1208. Ledge 1137 may be supported from below by one or more protrusions 1110 extending under ledge 1137.

Bottom surface 1407 may extend above and across protrusions 1110. Bottom surface 1407 and inner surface 1313 of walls 1112 of a protrusion may bound a hollow region 1415. A region 1415 may lie within a protrusion 1110. Regions 1415 may lie within protrusions 1110. Bottom surface 1407 and walls 1112 of a protrusion 1110 may define a first opening 1416 to the protrusion's region 1415. The side view provided by FIG. 14 obscures a second opening to region 1415. The second opening (not shown) may face the first opening.

Figure 15:
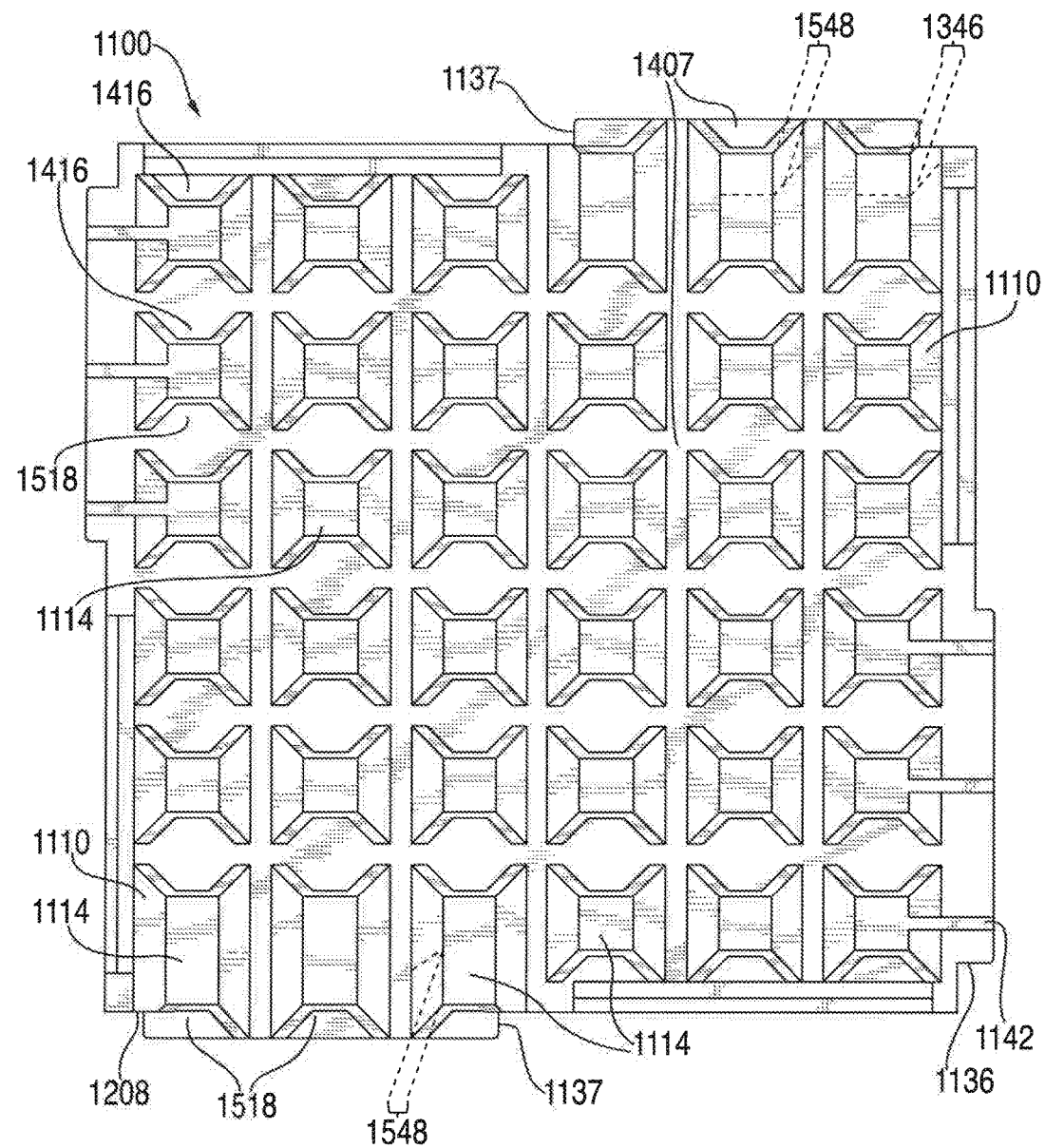
FIG. 15 is a bottom plan view of the multi-level unitary safety surface tile shown in FIG. 11.

FIG. 15 shows tile 1100 with second openings 1518 of protrusions 1110 facing first openings 1416 of protrusions 1110. Protrusions 1110 may extend between bottom surface 1407 and bottom-caps 1114.

Ledge 1136 may extend laterally from edge 1208 and may be supported by rib 1142 extending from a protrusion 1110.

Ledge 1137 may extend from edge 1208 and may be supported by untruncated extension 1548. Untruncated extension 1548 may include a lateral extension of a protrusion 1110 toward an edge of ledge 1137 distal and parallel to edge 1208. Untruncated extension 1548 may extend beyond truncated extension 1346. Truncated extension 1346 may not extend to the edge of ledge 1137 distal and parallel to edge 1208. Truncated extension 1346 may extend to edge 1208.

With tile 1100 disposed with bottom-caps 1114 resting on the underlayer (not shown), protrusions 1110 featuring untruncated extension 1548 may support ledge 1137 from below.

Figure 16:
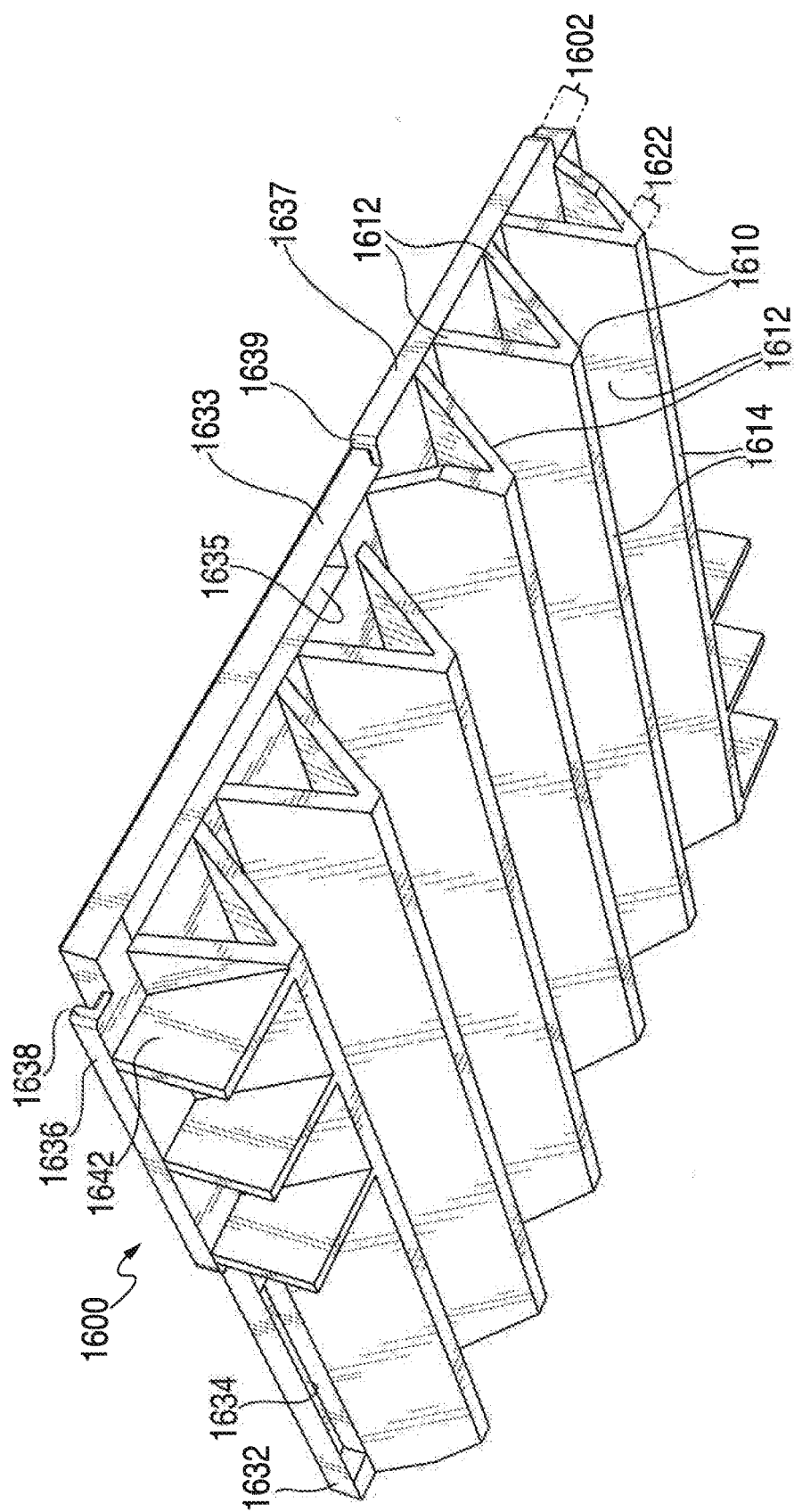
FIG. 16 is a bottom perspective view of a multi-level unitary safety surface tile in accordance with principles of the invention.

FIG. 16 shows multi-level unitary safety surface tile 1600. Tile 1600 may have none, some or all of the features and functions of tile 100 (shown in FIGS. 1-5). Tile 1600 may have none, some or all of the features and functions of tile 600 (shown in FIGS. 6-10). Tile 1600 may have none, some or all of the features and functions of tile 1100 (shown in FIGS. 11-15).

Tile 1600 may be substantially rectilinear. Tile 1600 may be substantially rectangular. Tile 1600 may be substantially square.

Tile 1600 may include upper level 1602. Tile 1600 may include protrusions 1610. Protrusions 1610 may extend away from upper level 1602. A protrusion 1610 may include walls 1612. A protrusion 1610 may include bottom-cap 1614. Walls 1612 of a protrusion 1610 may converge away from upper level 1602. Walls 1612 of protrusion 1610 may converge toward bottom-cap 1614.

Tile 1600 may include lower level 1622. Lower level 1622 may include bottom-caps 1614. Lower level 1622 may be disposed upon the underlayer (not shown). Tile 1600 may be disposed upon the underlayer such that lower level 1622 rests upon the underlayer. Tile 1600 may be disposed upon the underlayer such that bottom-caps 1614 rest upon the underlayer.

Tile 1600 may include front proximal ledge 1632. Ledge 1632 may include interlock feature 1634. Interlock feature 1634 may include an interlock trough.

Tile 1600 may include front distal ledge 1636. Ledge 1636 may include interlock feature 1638. Interlock feature 1638 may include an interlock tongue.

Tile 1600 may include side proximal ledge 1633. Ledge 1633 may include interlock feature 1635. Interlock feature 1635 may include an interlock trough.

Tile 1600 may include side distal ledge 1637. Ledge 1637 may include interlock feature 1639. Interlock feature 1639 may include an interlock tongue. Ledge 1637 may be supported by one, or more than one, protrusion 1610.

Ledge 1636 may be supported by one, or more than one, interlock support rib 1642. Rib 1642 may extend away from ledge 1636. Rib 1642 may be supported from below. A bottom surface of rib 1642 may be disposed upon the underlayer (not shown). Tile 1600 may be disposed upon the underlayer such that the bottom surface of rib 1642 rests upon the underlayer. Lower level 1622 may include the bottom surface of rib 1642.

A second multi-level unitary safety surface tile (not shown) substantially similar to tile 1600 (or to tile 100 shown in FIG. 1 or to tile 600 shown in FIG. 6 or to tile 1100 shown in FIG. 11) may be disposed upon the underlayer (not shown). The second tile may be adjoined to tile 1600 such that interlock feature 1634 may accept and hold an interlock tongue of the second tile similar to interlock feature 1639 or to interlock feature 1638. Similarly, interlock feature 1638 may be accepted and held by an interlock trough of the second tile similar to interlock feature 1635 or to interlock feature 1634.

Figure 17:
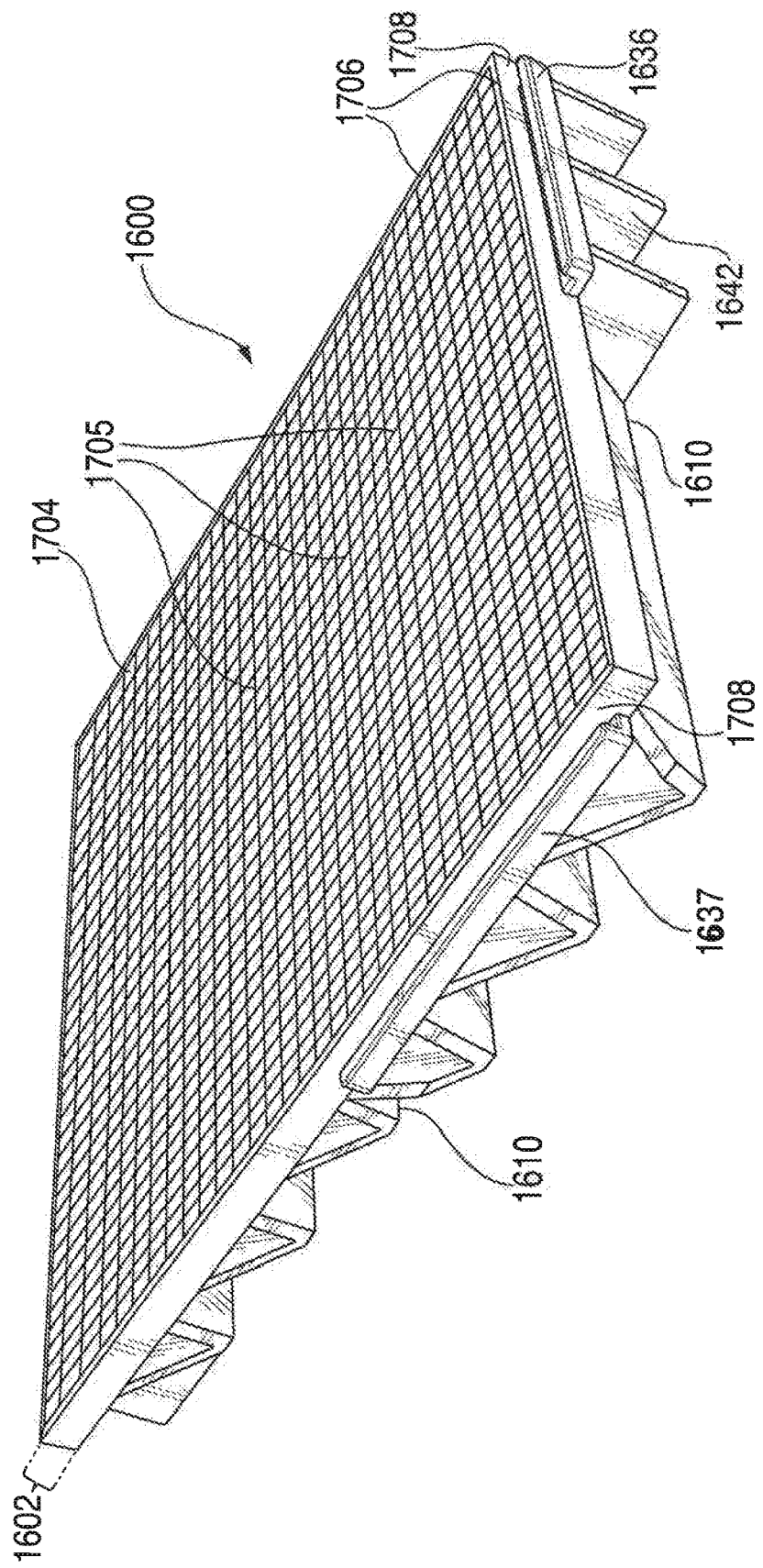
FIG. 17 is a top perspective view of the multi-level unitary safety surface tile shown in FIG. 16.

FIG. 17 shows upper level 1602 of tile 1600, with protrusions 1610 extending downward away from upper level 1602.

Upper level 1602 may have an edge 1708. Edge 1708 may be part of a perimeter of tile 1600. Edge 1708 may extend along all the perimeter. Ledge 1637 may extend from edge 1708. Ledge 1636 may extend from edge 1708. Rib 1642 may extend downward away from ledge 1636. Rib 1642 may extend laterally away from protrusion 1610.

Upper level 1602 may have a top surface 1704. Surface 1704 may be substantially perpendicular to edge 1708. Surface 1704 may be coterminous with a surface area of upper level 1602 within the perimeter. Surface 1704 may lie upon all the area within edge 1708.

Surface 1704 may feature a texture 1705. Texture 1705 may be coterminous with surface 1704. Texture 1705 may be less extensive in area than surface 1704. Surface 1704 may contain a border 1706. Border 1706 may lie between texture 1705 and edge 1708. Border 1706 may serve as a bevel between surface 1704 and edge 1708. Border 1706 may be texture-less.

Figure 18:
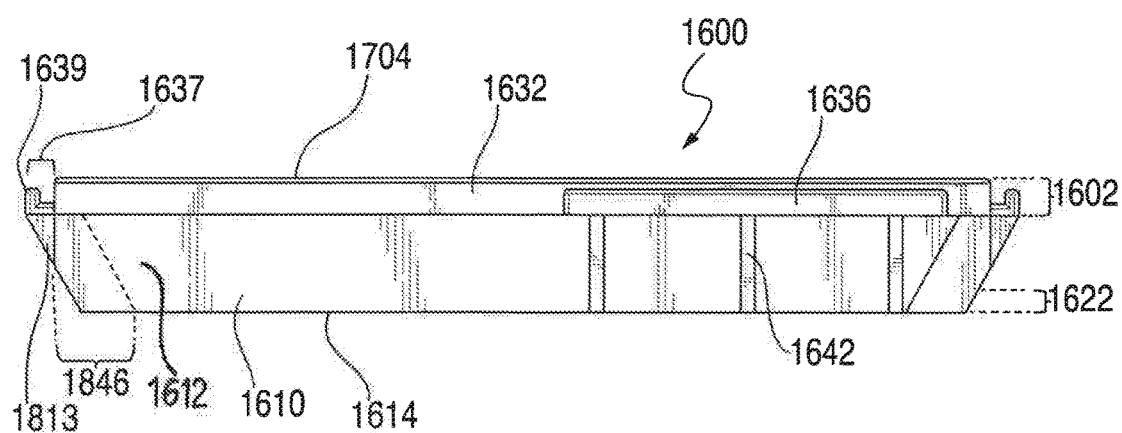
FIG. 18 is a front elevational view of the multi-level unitary safety surface tile shown in FIG. 16.

FIG. 18 shows protrusions 1610 of tile 1600 extending downward from upper level 1602, opposite top surface 1704, to lower level 1622. (In the front view provided by FIG. 18, depicted wall 1612 of protrusion 1610 lies in the foreground and obscures a view of a facing wall 1612 of protrusion 1610 lying in the background.) Rib 1642 may extend laterally from protrusion 1610 and may extend downward from upper level 1602 to lower level 1622. Lower level 1622 may include bottom-caps 1614 and the bottom surface of ribs 1642.

Ledge 1632 and ledge 1636 may extend laterally from upper level 1602. Rib 1642 may extend downward from ledge 1636 to lower level 1622. With tile 1600 disposed with lower layer 1622 resting on the underlayer (not shown), rib 1642 may support ledge 1636 from below.

Ledge 1637 may extend laterally from upper level 1602. A protrusion 1610 may feature truncated extension 1846. Truncated extension 1846 may include a lateral extension, between upper level 1602 and lower level 1622, of a foreground wall 1612 of that protrusion 1610 toward ledge 1637. Truncated extension 1846 may lie coplanar with foreground wall 1612. Ledge 1637 lying in the background of the front view provided by FIG. 18, truncated extension 1846 may not extend under ledge 1637.

An inner surface 1813 of a background wall 1612 (obscured by foreground wall 1612) of that protrusion 1610 may extend under ledge 1637. With tile 1600 disposed with lower layer 1622 resting on the underlayer (not shown), that protrusion 1610 may support ledge 1637 from below. Support of ledge 1637 may support interlock feature 1639. Support of interlock feature 1639 may support a complementary interlock feature of the second multi-level unitary safety surface tile (not shown) substantially similar to tile 1600, the second tile adjoined to tile 1600.

Figure 19:
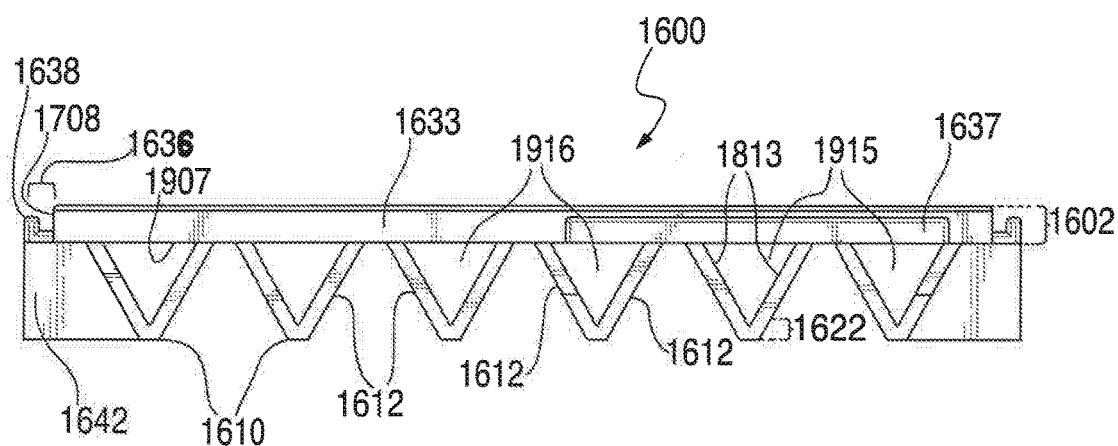
FIG. 19 is a right elevational view of the multi-level unitary safety surface tile shown in FIG. 16.

FIG. 19 shows a bottom surface 1907 of upper level 1602 of tile 1600. Protrusions 1610 may extend downward between bottom surface 1907 and lower level 1622.

Ledge 1636 may extend laterally from edge 1708. Rib 1642 may extend laterally under ledge 1636. Rib 1642 may extend downward from ledge 1636 and may extend downward between bottom surface 1907 and lower level 1622. With tile 1600 disposed with lower layer 1622 resting on the underlayer (not shown), rib 1642 may support ledge 1636 from below. Support of ledge 1636 may support interlock feature 1638. Support of interlock feature 1638 may support a complementary interlock feature of the second multi-level unitary safety surface tile (not shown) substantially similar to tile 1600, the second tile adjoined to tile 1600.

Ledge 1633 and ledge 1637 may extend laterally from edge 1708. Ledge 1637 may be supported from below by one or more protrusions 1610 extending under ledge 1637.

Bottom surface 1907 may extend above and across protrusions 1610. Bottom surface 1907 and inner surface 1813 of walls 1612 of a protrusion may bound a hollow region 1915. A region 1915 may lie within a protrusion 1610. Regions 1915 may lie within protrusions 1610. Bottom surface 1907 and walls 1612 of a protrusion 1610 may define a first opening 1916 to the protrusion's region 1915. The side view provided by FIG. 19 obscures a second opening to region 1915. The second opening (not shown) may face the first opening.

Figure 20:
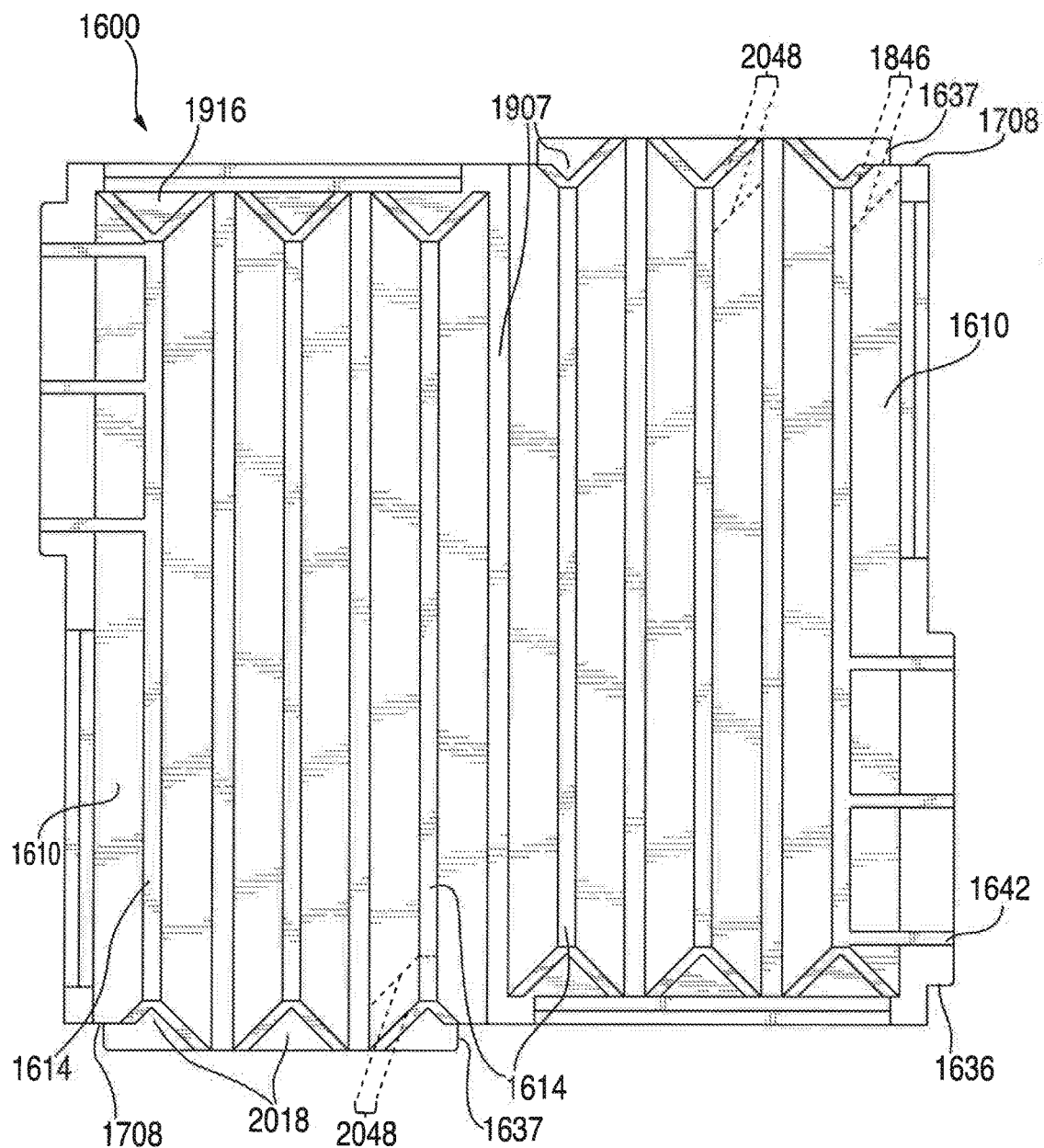
FIG. 20 is a bottom plan view of the multi-level unitary safety surface tile shown in FIG. 16.

FIG. 20 shows tile 1600 with second openings 2018 of protrusions 1610 facing first openings 1916 of protrusions 1610. Protrusions 1610 may extend between bottom surface 1907 and bottom-caps 1614.

Ledge 1636 may extend laterally from edge 1708 and may be supported by rib 1642 extending from a protrusion 1610.

Ledge 1637 may extend from edge 1708 and may be supported by untruncated extension 2048. Untruncated extension 2048 may include a lateral extension of a protrusion 1610 toward an edge of ledge 1637 distal and parallel to edge 1708. Untruncated extension 2048 may extend beyond truncated extension 1846. Truncated extension 1846 may not extend to the edge of ledge 1637 distal and parallel to edge 1708. Truncated extension 1846 may extend to edge 1708.

With tile 1600 disposed with bottom-caps 1614 resting on the underlayer (not shown), protrusions 1610 featuring untruncated extension 2048 may support ledge 1637 from below.

Figure 21:
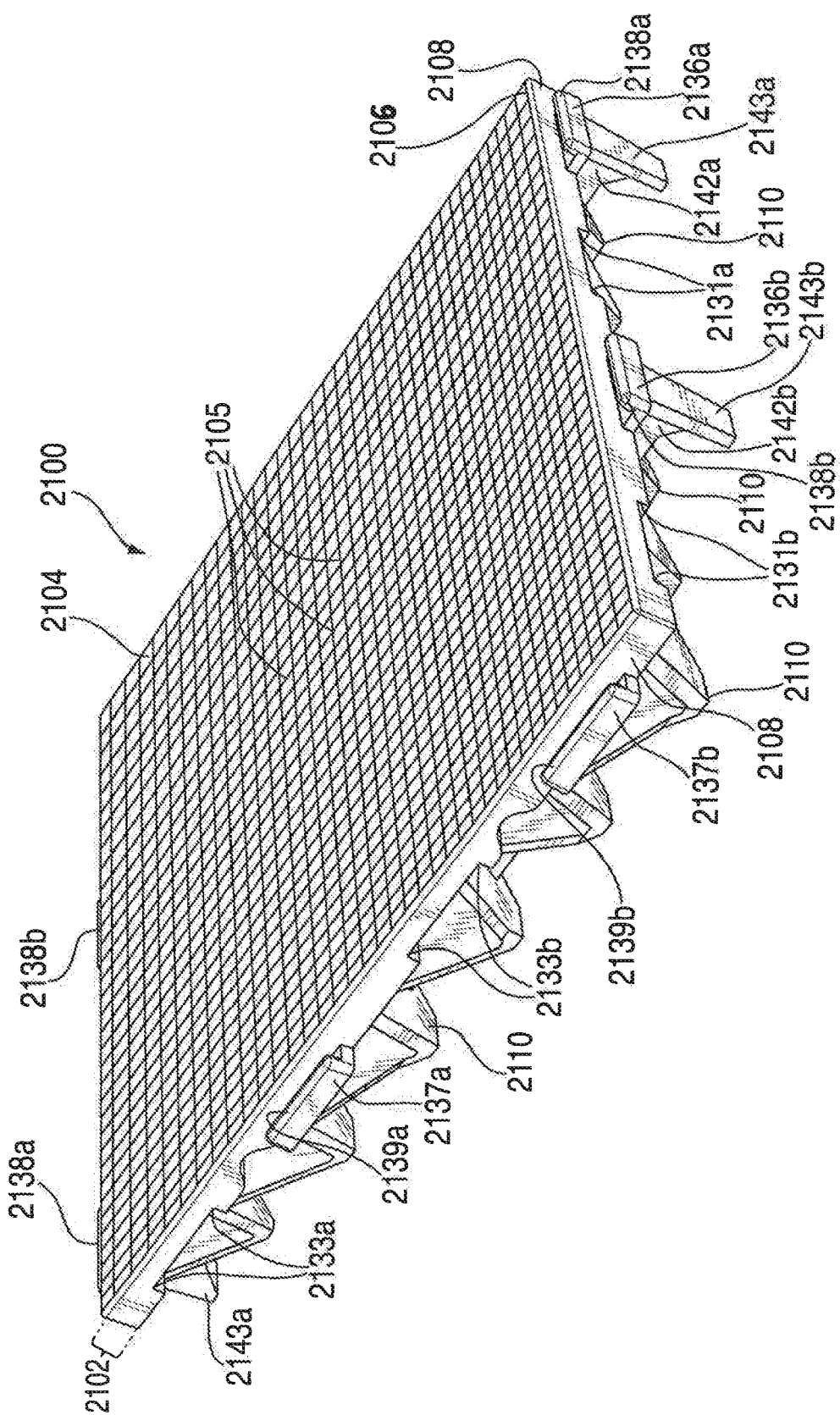
FIG. 21 is a top perspective view of a multi-level unitary safety surface tile in accordance with principles of the invention.

FIG. 21 shows multi-level unitary safety surface tile 2100. Tile 2100 may have none, some or all of the features and functions of tile 100 (shown in FIGS. 1-5). Tile 2100 may have none, some or all of the features and functions of tile 600 (shown in FIGS. 6-10). Tile 2100 may have none, some or all of the features and functions of tile 1100 (shown in FIGS. 11-15). Tile 2100 may have none, some or all of the features and functions of tile 1600 (shown in FIGS. 16-20).

Tile 2100 may be substantially rectilinear. Tile 2100 may be substantially rectangular. Tile 2100 may be substantially square.

Tile 2100 may include upper level 2102. Upper level 2102 may have a top surface 2104. Surface 2104 may be substantially perpendicular to edge 2108. Edge 2108 may be part of a perimeter of tile 2100. Edge 2108 may extend along all the perimeter. Surface 2104 may be coterminous with a surface area of upper level 2102 within the perimeter. Surface 2104 may lie upon all the area within edge 2108.

Surface 2104 may feature a texture 2105. Texture 2105 may be coterminous with surface 2104. Texture 2105 may be less extensive in area than surface 2104. Surface 2104 may contain a border 2106. Border 2106 may lie between texture 2105 and edge 2108. Border 2106 may serve as a bevel between surface 2104 and edge 2108. Border 2106 may be texture-less.

Tile 2100 may include side interlock ledge 2137a and side interlock ledge 2137b. Ledges 2137a and 2137b may extend laterally from edge 2108. Ledges 2137a and 2137b may be supported by protrusions 2110. Protrusions 2110 may extend away from upper level 2102, opposite top surface 2104.

Ledges 2137a and 2137b may include interlock features 2139a and 2139b, respectively. Interlock features 2139a and 2139b may include interlock tongues.

Tile 2100 may include front interlock ledge 2136a and front interlock ledge 2136b. Ledge 2136a and ledge 2136b may extend laterally from edge 2108. Ledge 2136a and ledge 2136b may be supported from below by interlock ledge support 2143a and interlock ledge support 2143b, respectively. Support 2143a and support 2143b may be supported laterally by rib 2142a and rib 2142b, respectively. Rib 2142a and rib 2142b may join support 2143a and 2143b, respectively, each to a protrusion 2110. Ledges 2136a and 2136b may include interlock feature 2138a and interlock feature 2138b, respectively. Interlock features 2138a and 2138b may include interlock tongues.

Tile 2100 may include front interlock slots 2131a and 2131b. Tile 2100 may include side interlock slots 2133a and 2133b. Interlock slots 2131a, 2131b, 2133a and 2133b may provide access to interlock structures such as interlock troughs (not shown) that may be structurally complementary to interlock tongues on adjoining tiles (not shown) substantially similar to tile 2100.

Figure 22:
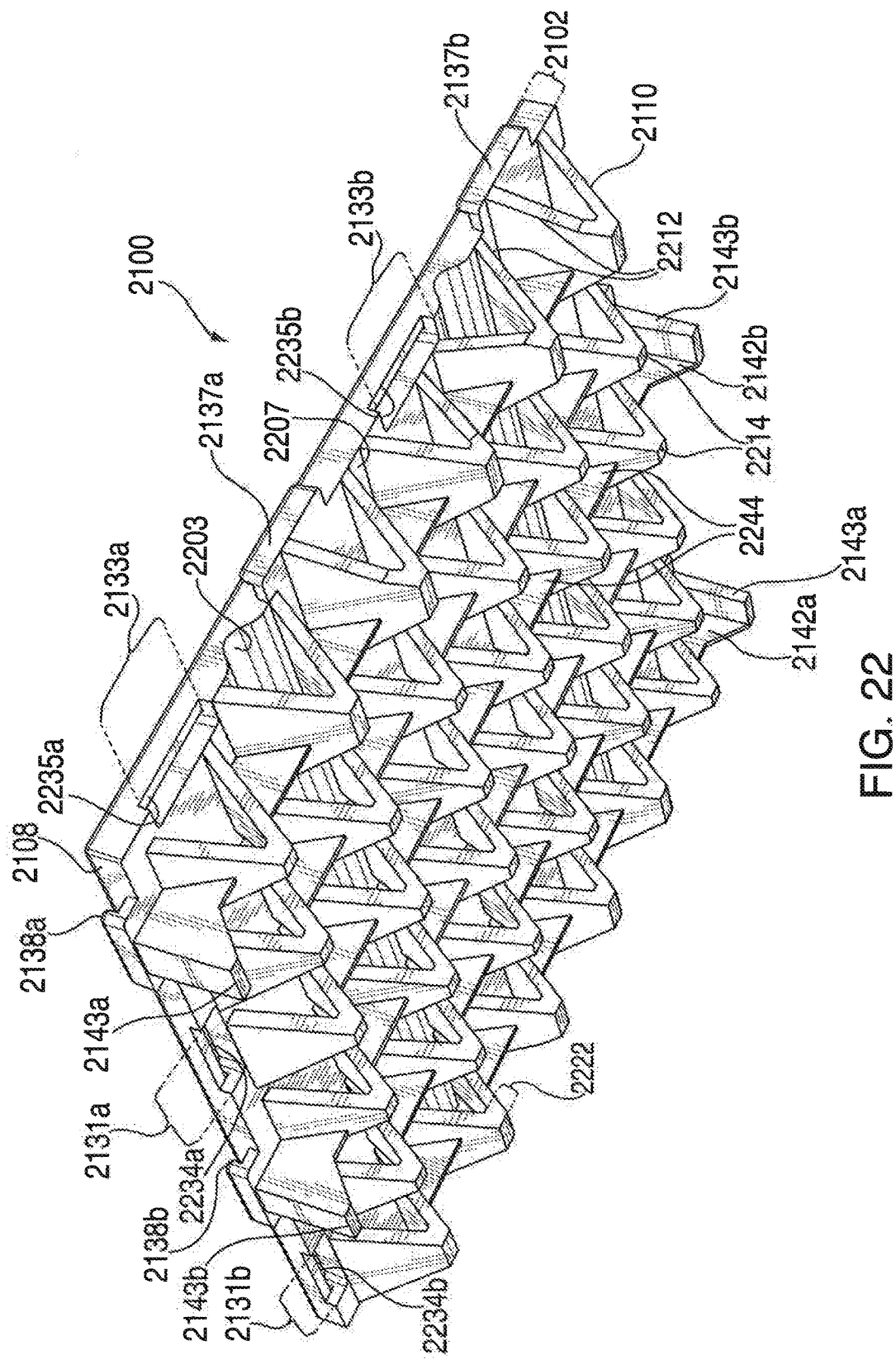
FIG. 22 is a bottom perspective view of the multi-level unitary safety surface tile shown in FIG. 21.

FIG. 22 shows bottom surface 2207 of upper level 2102 of tile 2100. Bottom surface 2207 may feature channel 2203. Channel 2203 may facilitate stabilization of tile 2100 during manufacture of tile 2100.

Protrusions 2110 may extend between bottom surface 2207 and bottom-caps 2214. Walls 2212 of a protrusion 2110 may converge away from upper level 2102 toward a bottom-cap 2214. Protrusions 2110 may extend between upper level 2102 and lower level 2222. Lower level 2222 may include bottom-caps 2214. Lower level 2222 may include bottom surfaces of supports 2143a and 2143b.

Protrusions 2110 may be supported by ribs 2142a and 2142b. Protrusions 2110 may be supported by inter-protrusion ribs 2244. Rib 2244 may support adjacent protrusions 2110. Rib 2244 may strengthen adjacent protrusions 2110. Rib 2244 may increase impact attenuation of adjacent protrusions 2110. Rib 2244 may increase impact attenuation of tile 2100.

Rib 2244 may span a gap between adjacent protrusions 2110. Between adjacent protrusions 2110, upper level 2102 may bear a side of rib 2244. Between adjacent protrusions 2110, bottom surface 2207 may be continuous with the side of rib 2244. Rib 2244 may extend away from upper level 2102. Rib 2244 may have an extension away from upper level 2102. Rib 2244 may span a gap between facing walls 2212 of adjacent protrusions 2110. A side of rib 2244 may be continuous with wall 2212 along the extension of rib 2244 away from upper level 2102.

Rib 2244 may extend toward lower level 2222. Rib 2244 may have an extension toward lower level 2222. A side of rib 2244 may be continuous with wall 2212 along the extension of rib 2244 toward lower level 2222. Rib 2244 may extend from upper level 2102 toward lower level 2222. Rib 2244 may extend between upper level 2102 and lower level 2222. Rib 2244 may extend completely from upper level 2102 to lower level 2222. Rib 2244 may extend partially from upper level 2102 toward lower level 2222.

Rib 2244 may have a thickness that is uniform over the extension of rib 2244 between upper level 2102 and lower level 2222. Rib 244 may have a thickness that is non-uniform over the extension of rib 2244 between upper level 2102 and lower level 2222. Rib 2244 may have a thickness that decreases along the extension of rib 2244 from upper level 2102 toward lower level 2222.

Front interlock slots 2131a and 2131b may provide access to interlock features 2234a and 2234b, respectively. Side interlock slots 2133a and 2133b may provide access to interlock features 2235a and 2235b, respectively. Interlock features 2234a, 2234b, 2235a and 2235b may include interlock structures such as interlock troughs that may be structurally complementary to such interlock structures as interlock tongues on adjoining tiles (not shown) substantially similar to tile 2100.

With tile 2100 disposed with lower level 2222 resting on the underlayer (not shown), protrusions 2110 may support upper level 2102 from below. With tile 2100 disposed with bottom-caps 2214 resting on the underlayer, protrusions 2110 adjacent edge 2108 may support ledges 2137a and 2137b from below. With tile 2100 disposed with bottom surfaces of supports 2143a and 2143b resting on the underlayer, supports 2143a and 2143b may support interlock features 2138a and 2138b, respectively, from below. Support of interlock feature 2138a and 2138b may support complementary interlock features of a second multi-level unitary safety surface tile (not shown) substantially similar to tile 2100, the second tile adjoined to tile 2100.

Thus, apparatus and methods for multi-level unitary safety surface tiles and associated structures have been provided. Persons skilled in the art will appreciate that the present invention can be practiced by other than the described embodiments, which are presented for purposes of illustration rather than of limitation. The present invention is limited only by the claims that follow.

What is claimed is:

1. A multi-level unitary safety surface tile of a unitary safety surface, the tile configured to attenuate impact force when the tile is disposed upon a substrate underlayer, said tile comprising:
    an upper tile level; and
    at least six hollow protrusions disposed below the upper tile level, each of the protrusions including at least two resilient substantially straight walls, the walls:
        converging away from junctures with the upper tile level to form a lower tile level, each juncture substantially straight along its length, a lower tile level convergence of the walls covered from above by the upper tile level; and
        defining, between the upper tile level and the lower tile level, two openings; wherein:
    the tile is of monolithic construction;
    the lower tile level is configured to be disposed upon the substrate underlayer; and,
    when the tile is not subject to impact force, the lower tile level is disposed substantially at a preset distance from the upper tile level.

2. The multi-level unitary safety surface tile of claim 1, wherein the tile is a one-piece casting.

3. The multi-level unitary safety surface tile of claim 1, wherein the tile is a one-piece molding.

4. The multi-level unitary safety surface tile of claim 1, further comprising a plurality of tile edges, at least one of the plurality of tile edges including an interlock for engaging a complementary structural element of another tile of the unitary safety surface.

5. The multi-level unitary safety surface tile of claim 4, wherein the complementary structural element is a hollow protrusion of the other tile.

6. The multi-level unitary safety surface tile of claim 1, further comprising a rib spanning facing walls of adjacent protrusions.

7. The multi-level unitary safety surface tile of claim 1, wherein the tile includes a rubbery material.

* * * * *